US012573165B2

(12) United States Patent
Menon et al.

(10) Patent No.: US 12,573,165 B2
(45) Date of Patent: Mar. 10, 2026

(54) SHARED 3D PERSPECTIVE VIEWING OF AN ASSET IN AN EXTENDED REALITY SYSTEM

(71) Applicant: Autodesk, Inc., San Francisco, CA (US)

(72) Inventors: Ajay Vijayabalan Menon, Toronto (CA); João Lucas Lautenschlager Cortez Alves, Sao Paulo (BR); Gabriel M. Paez, Portland, OR (US); Shyam Prathish Sargunam, Bellevue, WA (US)

(73) Assignee: Autodesk, Inc., San Francisco, CA (US)

( * ) Notice: Subject to any disclaimer, the term of this patent is extended or adjusted under 35 U.S.C. 154(b) by 6 days.

(21) Appl. No.: 18/506,974

(22) Filed: Nov. 10, 2023

(65) Prior Publication Data

US 2025/0157164 A1     May 15, 2025

(51) Int. Cl.
G06T 19/20          (2011.01)
G06F 3/01          (2006.01)
          (Continued)

(52) U.S. Cl.
CPC .............. G06T 19/20 (2013.01); G06F 3/012 (2013.01); G06T 15/20 (2013.01); G06F 3/0346 (2013.01);
          (Continued)

(58) Field of Classification Search
CPC ... G06T 19/20; G06T 15/20; G06T 2219/024; G06T 2219/2004; G06T 2219/2016;
          (Continued)

(56) References Cited

U.S. PATENT DOCUMENTS 6,570,563 B1     5/2003 Honda
6,629,065 B1     9/2003 Gadh et al.
          (Continued)

FOREIGN PATENT DOCUMENTS

EP          3825816 A1     5/2021
WO     WO 2018175971 A1     9/2018

OTHER PUBLICATIONS

Extended European Search Report in European Appln No. 24211540.0, dated Apr. 11, 2025, 16 pages.
          (Continued)

*Primary Examiner* — Grant Sitta

(74) *Attorney, Agent, or Firm* — Fish & Richardson P.C.

(57)          ABSTRACT

Methods, systems, and apparatus, including medium-encoded computer program products, for computer aided design of physical structures include: rendering, to a display device of a first user, a first user's view into an extended reality environment, the first user's view being generated using a first pose being tracked for the first user; identifying that a first avatar associated with the first user has entered a shared perspective mode with a second avatar associated with a second user of the XR environment, wherein the shared perspective mode has a single frame of reference in the XR environment that is shared by the first user and the second user; and performing, while in the shared perspective mode, the rendering to the display device of the first user.

34 Claims, 17 Drawing Sheets

(51) Int. Cl.
*G06F 3/0346* (2013.01)
*G06T 15/20* (2011.01)

(52) U.S. Cl.
CPC .................. *G06T 2219/024* (2013.01); *G06T 2219/2004* (2013.01); *G06T 2219/2016* (2013.01)

(58) Field of Classification Search
CPC .... G06F 3/012; G06F 3/0346; G06F 3/04817; G06F 3/0482; G06F 3/04842; G06F 3/04845; G06F 3/014; G06F 3/017; G06F 3/011; G06F 3/04815; H04N 7/157
See application file for complete search history.

(56) References Cited

U.S. PATENT DOCUMENTS

| | | | |
|---|---|---|---|
| 9,256,282 B2 | 2/2016 | Latta et al. | |
| 10,701,320 B2 * | 6/2020 | Valli | G06T 15/005 |
| 11,592,896 B2 | 2/2023 | Paez et al. | |
| 2009/0106669 A1 | 4/2009 | Winkler et al. | |
| 2009/0259948 A1 | 10/2009 | Hamilton, II et al. | |
| 2012/0264511 A1 | 10/2012 | Marsland et al. | |
| 2013/0047208 A1 | 2/2013 | Shuster et al. | |
| 2015/0120834 A1 | 4/2015 | Maheshwari et al. | |
| 2017/0354875 A1 | 12/2017 | Marks et al. | |
| 2019/0088016 A1 | 3/2019 | Tadros et al. | |
| 2020/0142475 A1 | 5/2020 | Paez et al. | |
| 2023/0251705 A1 | 8/2023 | Paez et al. | |
| 2024/0040105 A1 * | 2/2024 | Imai | G06T 15/20 |
| 2024/0106984 A1 | 3/2024 | Menon et al. | |
| 2025/0013343 A1 * | 1/2025 | Smith | G06F 3/04845 |
| 2025/0029328 A1 * | 1/2025 | Smith | H04N 7/157 |

OTHER PUBLICATIONS

U.S. Appl. No. 18/240,646, filed Aug. 31, 2023, Menon et al.
Greenberg and Marwood, "Real Time Groupware as a Distributed System: Concurrency Control and its Effect on the Interface," Research Report 94/534/03, Department of Computer Science, University of Calgary, Alberta, Canada, 1994, 12 pages.

* cited by examiner

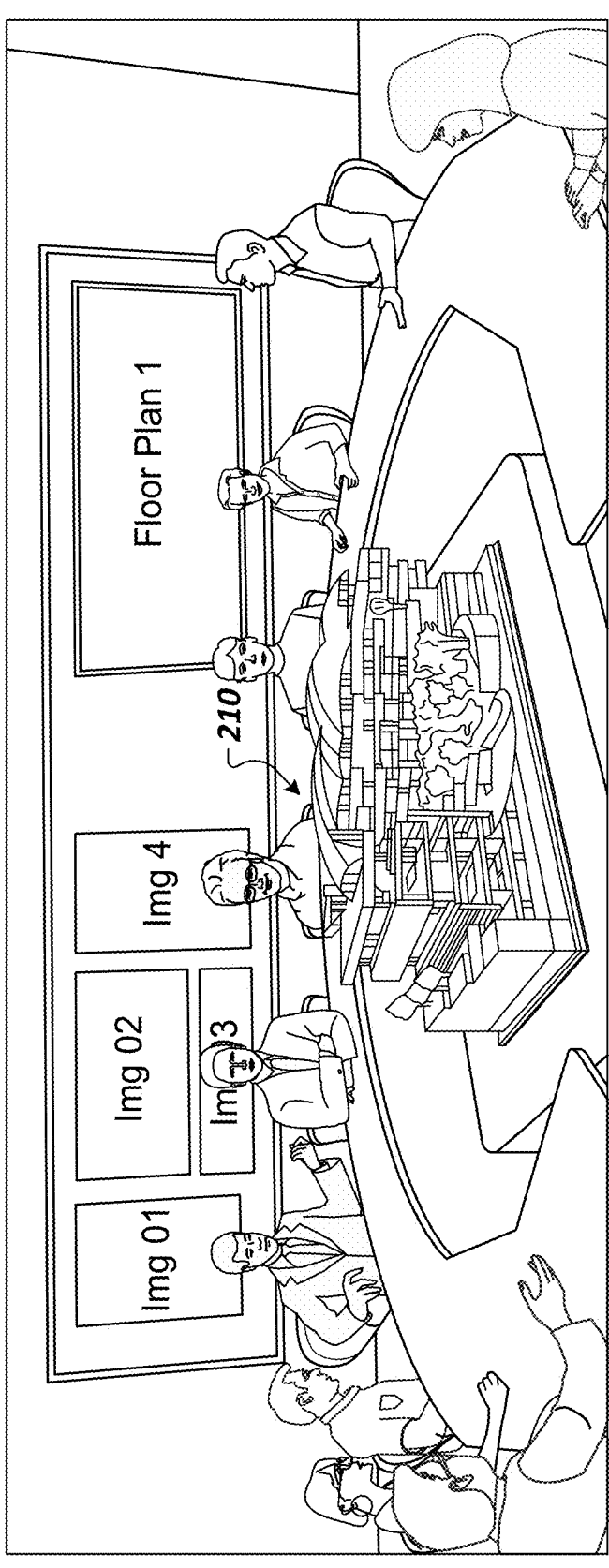
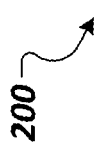
*FIG. 2A*

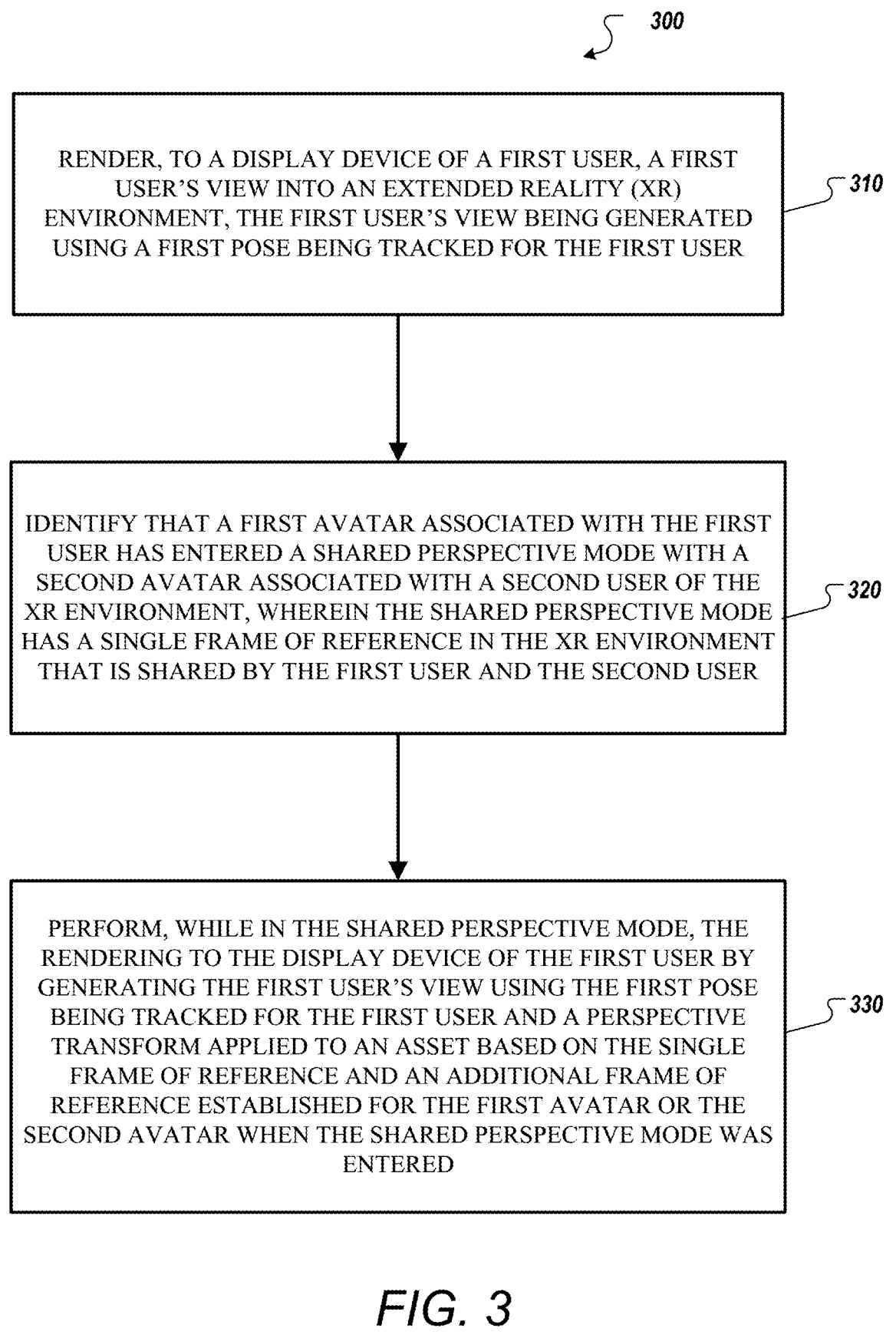

RENDER, TO A DISPLAY DEVICE OF A FIRST USER, A FIRST USER'S VIEW INTO AN EXTENDED REALITY (XR) ENVIRONMENT, THE FIRST USER'S VIEW BEING GENERATED USING A FIRST POSE BEING TRACKED FOR THE FIRST USER — 310

IDENTIFY THAT A FIRST AVATAR ASSOCIATED WITH THE FIRST USER HAS ENTERED A SHARED PERSPECTIVE MODE WITH A SECOND AVATAR ASSOCIATED WITH A SECOND USER OF THE XR ENVIRONMENT, WHEREIN THE SHARED PERSPECTIVE MODE HAS A SINGLE FRAME OF REFERENCE IN THE XR ENVIRONMENT THAT IS SHARED BY THE FIRST USER AND THE SECOND USER — 320

PERFORM, WHILE IN THE SHARED PERSPECTIVE MODE, THE RENDERING TO THE DISPLAY DEVICE OF THE FIRST USER BY GENERATING THE FIRST USER'S VIEW USING THE FIRST POSE BEING TRACKED FOR THE FIRST USER AND A PERSPECTIVE TRANSFORM APPLIED TO AN ASSET BASED ON THE SINGLE FRAME OF REFERENCE AND AN ADDITIONAL FRAME OF REFERENCE ESTABLISHED FOR THE FIRST AVATAR OR THE SECOND AVATAR WHEN THE SHARED PERSPECTIVE MODE WAS ENTERED — 330

*FIG. 3*

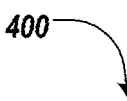
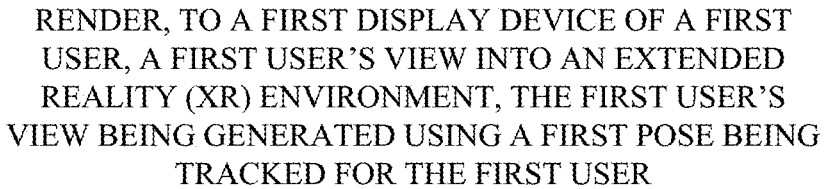

RENDER, TO A FIRST DISPLAY DEVICE OF A FIRST USER, A FIRST USER'S VIEW INTO AN EXTENDED REALITY (XR) ENVIRONMENT, THE FIRST USER'S VIEW BEING GENERATED USING A FIRST POSE BEING TRACKED FOR THE FIRST USER ⟋ 410

IDENTIFY THAT A SECOND AVATAR ASSOCIATED WITH A SECOND USER OF THE XR ENVIRONMENT ENTERS A SHARED PERSPECTIVE MODE WITH A FIRST AVATAR ASSOCIATED WITH THE FIRST USER ⟋ 420

GENERATE A SECOND USER'S VIEW FOR AN ASSET OF THE XR ENVIRONMENT BY APPLYING A PERSPECTIVE TRANSFORM TO THE ASSET OF THE XR ENVIRONMENT BASED ON A SHARED FRAME OF REFERENCE FOR THE SHARED PERSPECTIVE MODE AND A SECOND POSE THAT IS TRACKED FOR THE SECOND USER ⟋ 430

RENDER, TO A SECOND DISPLAY OF THE SECOND USER AND WHILE IN THE SHARED PERSPECTIVE MODE, THE SECOND USER'S VIEW INTO THE XR ENVIRONMENT ⟋ 440

*FIG. 4A*

570

RENDER, TO A DISPLAY DEVICE OF A FIRST USER, A FIRST USER'S VIEW INTO AN EXTENDED REALITY (XR) ENVIRONMENT, THE FIRST USER'S VIEW BEING GENERATED USING A FIRST POSE BEING TRACKED FOR THE FIRST USER — 575

IDENTIFY THAT A FIRST AVATAR ASSOCIATED WITH THE FIRST USER HAS ENTERED A SHARED PERSPECTIVE MODE WITH A SECOND AVATAR ASSOCIATED WITH A SECOND USER OF THE XR ENVIRONMENT, WHEREIN THE SHARED PERSPECTIVE MODE HAS A SINGLE FRAME OF REFERENCE IN THE XR ENVIRONMENT THAT IS TO BE SHARED BY THE FIRST USER AND THE SECOND USER — 580

PERFORM, WHILE IN THE SHARED PERSPECTIVE MODE, THE RENDERING TO THE DISPLAY DEVICE OF THE FIRST USER BY GENERATING THE FIRST USER'S VIEW BY APPLYING A PERSPECTIVE TRANSFORM TO THE SECOND AVATAR OF THE SECOND USER BASED ON THE SINGLE FRAME OF REFERENCE, A SECOND FRAME OF REFERENCE ESTABLISHED FOR THE SECOND AVATAR AND A FIRST FRAME OF REFERENCE ESTABLISHED FOR THE FIRST AVATAR FOR THE SHARED PERSPECTIVE MODE WAS ENTERED — 585

*FIG. 5B*

SHARED 3D PERSPECTIVE VIEWING OF AN ASSET IN AN EXTENDED REALITY SYSTEM

BACKGROUND

This specification relates to shared perspective viewing of content between multiple users. Further, this specification relates to physical model data used in computer graphics applications, such as computer-generated animation and/or computer-aided design of physical structures and/or other visualization systems and techniques.

Computer systems and applications can provide virtual reality (VR) environments that enable users to perform individual or collaborative tasks. A VR environment can be supported by different types of devices that can be used for providing interactive user input (e.g., goggles, joy sticks, sensor-based interaction supporting tools, pencils, touch pads, gloves, etc.). By utilizing the interactive techniques and tools supported by a VR environment, e.g., VR collaboration platform, users are able to work independently or in cooperation with other users within the same and/or in different three-dimensional space over one or more projects. A display device of a user collaborating in a VR environment with other user can render an asset in the respective view as well as avatars of respective other users participating in the VR environment. In some cases, avatars can move their location and engage in collaborative action(s) with regard to the asset. An avatar of one user can be rendered in another user's views based on identified location data indicating a position in the VR environment, for example, based on tracked position in relation to VR controllers of the other user.

SUMMARY

This specification relates to shared perspective viewing of one or more assets between users in an extended reality (XR) environment. The shared perspective viewing can be associated with viewing of assets that can be a set of content including 2D and/or 3D content. In some instances, the set of content can be such as model objects that can be 3D objects. In some cases, the assets that can be viewed in the XR environment can have a 3D orientation in the XR environment. For example, 2D content such as presentation of information on a virtual screen in the XR environment can be rendered in a view of a user in the XR environment, where the 2D content can have a 3D orientation and can be repositioned to change its orientation. When users in the XR environment are provided with a shared perspective view for an asset, they can also be provided with a view of avatars of other users to keep the spatial relationship between the viewers who share the perspective. The avatars can be rendered as 2D or 3D objects in the XR environment and can have a position and orientation for viewing the space in the XR environment. The shared perspective view can be performed in the context of collaborative work on projects, such as architectural design projects including construction projects, product manufacturing projects, design projects, e.g., designs of machines, buildings, constructions sites, plants, civil engineering projects, etc., as well as in the context of virtual reality (VR) gaming, among other immersive experience interactions between users viewing the same content.

In some implementations, an XR collaboration platform can provide tools and techniques for generating, maintaining, and operating interconnected environments across multiple devices where an asset can be presented from a shared perspective while spatial relationships between avatars are maintained. In this manner, the view of an asset can be maintained as the same when presented to multiple users while at the same time, the users can see other users as spatially distant avatars to maintain the understanding of multi-user viewing. In some implementations, the shared perspective view can be provided by rotating an asset to match the perspective of each user based on the view that is shared. In some implementations, the shared perspective view can be provided by changing the position of the avatars of the users to match the shared perspective so that they can perceive the model from the same perspective. In those implementations, the users can be gathered in an avatar stack that can be visualized as a tray of avatars included in the shared perspective mode in front of the generated view for the respective user. The tray can include avatars correspond to the users that are in the shared perspective mode. The avatars in the tray can be rendered as 3D avatars (one or more of them and in combination with one or more that are 2D avatars) with a 3D position and a 3D orientation, where the avatars in the stack will be rendered with an offset based on the stack's 3D position and orientation (and optionally, the number of avatars to be included in the tray) so that the avatars (in the tray) can be included in the shared perspective mode where the avatars have the same viewpoint. In the avatar stack mode, since all the avatars have the same viewpoint, for each one of the avatars in the stack, the other avatar(s) are rendered in their view with an offset from their position so that the other avatar(s) can be seen. The other avatar(s) are rendered by repositioning according to a predefined offset from the shared position, where their gaze and pointing at the content that in the XR environment is reoriented as an adjustment that is needed in view of the offset from the viewpoint of the avatar.

In some implementations, when a first user is having a shared perspective view of a model object in a collaboration session, an avatar of a second user that is identified as an active speaker in the collaboration session and has the shared perspective towards the model object can be rendered as a 3D avatar and can have 3D orientation and position that are adjusted to be included in the view of the first user.

Multiple interconnected environments can be provided in an XR environment of an XR system, which can include a VR environment, an augmented reality (AR) environment, desktop environment, web preview environment, mobile native application environments, among other example environments that can be supported by different types of devices and corresponding interactive user input devices (e.g., goggles, joy sticks, sensor-based interaction supporting tools, pencils, touch pads, gloves, etc.) used by users who enter into the XR environment. In such an interconnected environment, a group of users can be gathered in a shared perspective mode. For example, the grouping of users in such a shared perspective mode can be triggered when a set of users indicate they want to collaborate on an asset such as an XR object, and the object is rendered from the same perspective to each of the users with avatars having different positions in the XR environment. Even if the avatars are substantially distant from one another in the XR environment, the users for those avatars can have a shared perspective of a set of content in the XR environment and be provided with a view of avatars of other user that share the same perspective view. In another example, the grouping of users can be triggered based on identifying that two or more user avatars are in close proximity (below a certain distance threshold, e.g., within half of a smallest, single-dimensional size of an avatar) in the XR environment, and they are then grouped in a shared mode where the avatars are associated with the same position for viewing. When a user wants their avatar to join a group of other avatars, the avatar is repositioned to the position of the group (stack). When multiple avatars of users are stacked, they are positioned at the same location in the XR environment to provide the same perspective in the XR environment; note that each user can still be allowed to control their own view and orientation, for example, by movements of the head, by gestures, or through instructions received at controllers or sensors associated with the respective users. When a view of the XR environment is rendered for one of the avatars, the view includes a presentation of the other avatars (from the stack) that have the same position of viewing in the XR environment. The other avatars are presented in the view as they are repositioned and reoriented to be rendered in the view of the XR environment for the user. By getting in the stack, the avatar can see the other avatars that share the location in the XR environment and can see where other avatar(s) are looking and/or pointing.

In some implementations, the grouping can be performed based on an active indication from a user to join a shared mode with other users, e.g., a group that can be seen as a tray of users from a third-person perspective. In some cases, moving away from avatars in a group can trigger modification of the grouping to exclude the avatar that has repositioned further away from the group. In some cases, users can navigate the positions of their avatar so that they switch locations, join one group or move to another group by interaction with their user input devices. By utilizing the interactive techniques and tools supported by the XR collaboration platform, users are able to have a share-perspective view of an asset even though their avatars are spatially distant from one another. The interactive techniques and tools of the present invention support immersive experiences for groups of users who share their perspective to view a portion of the content in an XR environment, e.g., content representing an XR object, and still be part of a multi-user viewing experience where avatars of other users can be seen. Each user has a different perspective view of the other avatars. In some instances, users can have a shared perspective view (for a set of content such as 3D content) in the XR environment where a transform can be applied to either (a) the set of content (e.g., a 3D model) to reorient and reposition it for presenting to each avatar that is in the shared perspective mode, or (b) the other avatar(s) of other users that are in the shared perspective mode to reorient and reposition those avatar(s) as they are rendered in each user's view when the avatars are stacked and have a shared position in order to make them viewable by the user.

In some implementations, the content can be rotated for each user so that each user who is part of a shared perspective viewing can have the same 3D perspective to view an asset in the XR environment and a different and specific view of other user avatars in the XR environment. With such an immersive experience, users have improved viewing of shared content irrespective of their exact position or the number of users participating in the experience. While the 3D perspective for viewing content can be shared, as a user can be viewing the content from the same direction as another user in the XR environment, the users still maintain an experience of having a spatial distance relative to one another since the user views can include rendered avatars of the other users that are offset based on the shared frame of reference for viewing the content. When a user interacts with content, for example, points to portions of the shared content, the pointing can be handled so that other users are able to see the pointing at the exact place in the previewed model as the place/location where the first user pointed when looking at his view on his device. A user who views shared content can see a handle (or a hand of the avatar) pointing to the content from another avatar, where the handle can be presented based on applying directional offsetting for the hands of the avatar (when the avatar is a 3D avatar), mirroring what can be seen in the real world to match the direction towards the point on the model at which the user was aiming.

In some implementations, to share the perspective view of content in an XR environment, a stack of avatars can be created so that users who are in closer proximity to each other can be grouped in a stack and be included in a shared mode, where, rather than rotating the content to be viewed, the avatars' position for viewing can be changed so that the multiple avatars are placed in a shared perspective mode associated with a particular position in the XR environment. The avatar stack is formed and has a position and orientation in the 3D space of the XR environment, and a visual tray can be rendered in the view of a user to include the avatars of other users in the shared perspective viewing in the XR environment. A tray with avatars of the users in the XR environment can be shown in front of the shared perspective of the stack for each user. The avatars as shown in the tray can be presented differently in the tray in the views of each respective user as they will be offset based on the stack's 3D position and the stack's 3D orientation (movement orientation defining a direction for the avatar to move if provided with user's input to go forward). Thus, in those cases, the adjusted perspective of the user allows for a group of users to have a shared 3D perspective of content in the XR environment while being provided with a visualization of other users who share the view in the rendered view. The positioning of the avatars in the view allows gestures and pointing of users to be seen, as well as an active speaker or presenter for the group to be identified. Such groups of stacked avatars can be seen from a third-person perspective as a group including a defined set of users represented with their avatars, names, or a combination thereof, where a third-person perspective can allow for an outside user to determine who the speaker is at any moment as well as to see how an avatar from the stack points to portions of the shared content, where a pointer presented by one avatar from the stack can be presented accurately to the view of the user outside of the stack, who sees the content from a different perspective.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

FIG. 2A shows an example table-top review mode provided for display to multiple users accessing an XR environment through different devices that view an asset in a shared perspective mode in accordance with implementations of the present disclosure.

FIG. 3 shows an example of a process to provide shared perspective views of assets in an XR environment in accordance with implementations of the present disclosure.

FIG. 4A shows an example of a process to provide a shared perspective mode for shared viewing of an XR object in an XR environment in accordance with implementations of the present disclosure.

FIG. 5B shows an example of a process for providing an avatar stack mode for shared perspective viewing of an object in an XR environment where a tray of avatars of users is rendered in accordance with implementations of the present disclosure.

Like reference numbers and designations in the various drawings indicate like elements.

DETAILED DESCRIPTION

Figure 1:
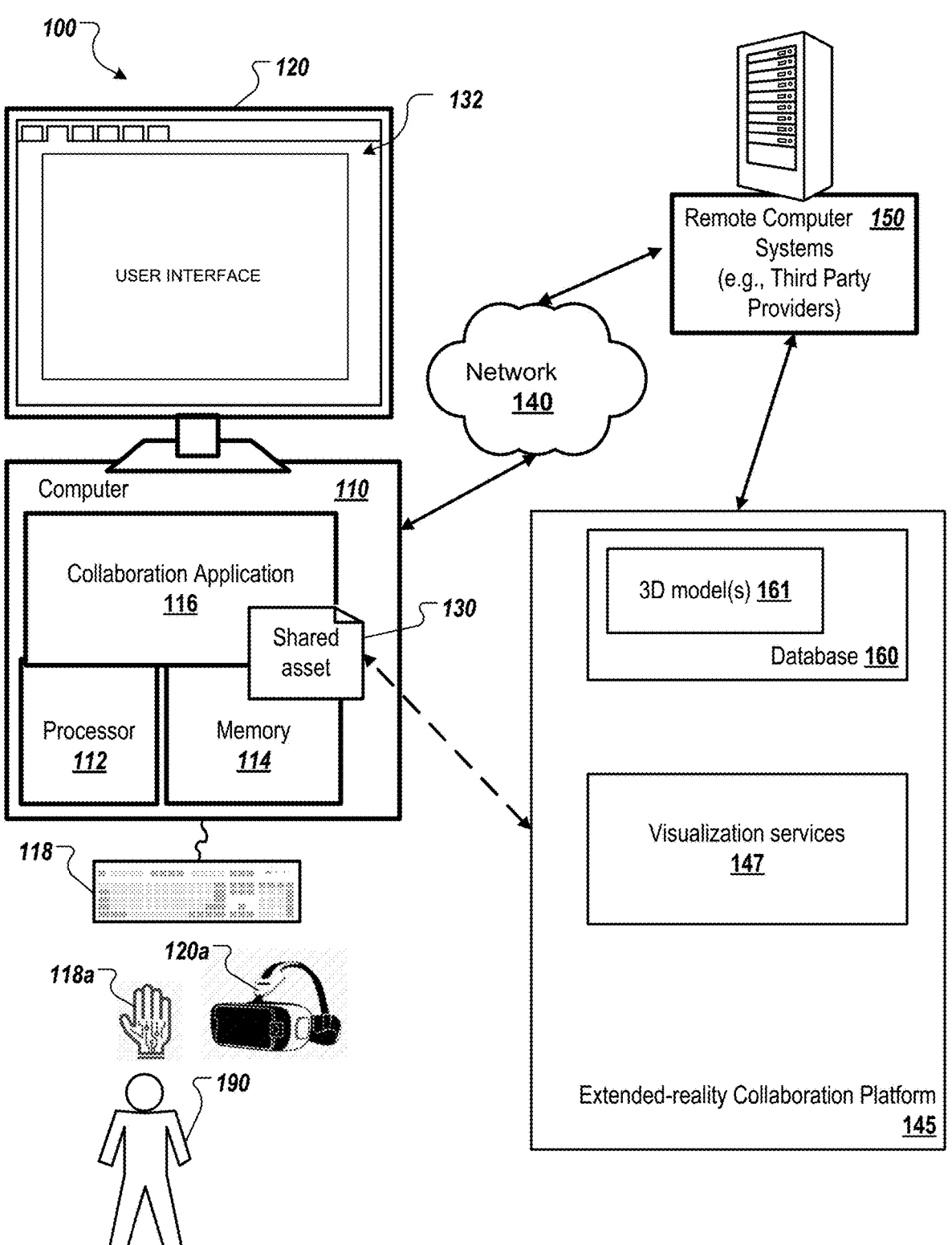
FIG. 1 shows an example of a system usable to support collaboration between users that share a view of assets in a shared perspective mode in an XR environment.

The present disclosure describes various tools and techniques for providing shared perspective views of 3D content to users in an XR environment.

When users have a meeting or other collective activity that involves viewing content, such as an asset (e.g., a document, a computer model (2D or 3D model), an object, motion pictures, structures, textures, materials, groups of avatars of users in the 3D space, etc.), in an XR (VR, AR, or mixed reality) environment, the users can be provided with a same-perspective view of at least some of the content at the same time even if their position and perspective as identified by the devices they use to access the environment are associated with a different viewing point.

Currently, when users interact in a collaborative space, everyone has their own viewpoint, which is discrete from all other users, which matches the viewing experience in the real world. However, such viewing from discrete points of view can impose restrictions on collaborative work on projects where sharing the same view is relevant for the interactive activity, or in cases where presentation of the same view is relevant for the experience of the user (e.g., participating in a 3D movie). Having discrete points of view may provide some users with a worse viewing position compared to others, or may limit a user from viewing a portion of a shared asset that is related to an interaction made by another user (e.g., pointing to a section of a model that is not visible from the viewpoint of the other user). For example, a movie cinema has multiple seats where usually only one or two spots have the "best view." Further, if avatars of users are positioned in the same location to be provided with the exact same view of the content, then users would not see other avatars in the XR environment and thus they would not be provided with an interactive experience with the other users (e.g., would not see how they point to content from the shared view). Thus, sharing the same perspective view for all users in a group while still maintaining the experience of an activity in a group (e.g., in a movie theater or a workshop or at a desk table) together with other people who can be seen as spatially distant can improve the user experience. In accordance with implementations of the present disclosure, a perspective transform can be applied to the shared content or to the avatars presented in the view of a user to improve the experience of users. In some instances, tools and techniques for presenting content (e.g., 2D or 3D content) in a shared mode where the content is presented from the same shared perspective to each user can be provided. With those tools and techniques, the view towards an asset can be with a shared perspective for all users, while the users can still view other user's avatars in the 3D space as spatially distant (and seen from a different angle in each view of the user) to support an immersive experience where some portion of the 3D environment is seen from a shared perspective by all users, while the view of avatars of users is offset to be integrated into each view based on the respective frames of references of each user.

Synchronous remote collaboration often requires multiple tools and techniques to support interaction between users during a creative process that has no fixed sequence of operations defined for each user. Therefore, users desire collaboration applications that provide flexible and seamless tools to integrate into interactive processes over a common shared document. Mixed-focus collaboration is a key to work processes such as brainstorming, design reviews, complex content creation, decision making, manufacturing scripts, and others. Mixed-focus collaboration may involve concurrent editing of a 3D model of an object by multiple users at multiple locations and/or at the same location in an interactive manner. Thus, a model is viewed by the users from multiple different remote instances in the collaborative mode, where one or more users can edit it. The 3D model can be presented to each of the users in their respective rendered views on their devices from the same shared perspective in accordance with implementations of the present disclosure.

In some instances, users can interact with shared assets (e.g., data, objects, avatars of other users) using different interfaces viewed from different devices or platforms, including desktop devices, tablets, VR and/or AR devices, among other examples. In some implementations, VR and AR devices can be referred to as mixed-reality (MR) or XR devices. Computer graphics applications include different software products and/or services that support generation of representations of three-dimensional (3D) objects that can be used for visualization of object models, for animation and video rendering, etc. Computer graphics applications also include computer animation programs and video production applications that generate 3D representations of objects and views during collaborative user reviews. 3D computer animations can be created in a variety of scenarios and in the context of different technologies. For example, 3D models of objects such as manufacturing sites, buildings, physical constructions, can be animated for display on user interfaces of native device applications, web application, VR applications, AR applications, among other examples. Prototyping models of objects can be performed in different environments, including a VR environment and based on VR technologies, an AR environment, display user interface, remote video streaming, among others.

In some implementations, users interact in an XR environment with shared content, such as a 3D model of an object, where the interactions can be supported by various environments accessed through different devices by the users. The XR collaboration can include a video conference call, an audio conference call, or a video and audio conference call, a virtual and/or augmented reality collaborative interactive environment, or a combination thereof. In some instances, one user may participate in a VR interactive session, another user may connect to the VR interactive session via accessing a conference call over a video and audio connection (e.g., relying on a video and audio tools and setup to interact) where the user may receive real-time streaming of the VR interactive session, and another user may participate only over a video connection (e.g., relying only on a video tool and setup (e.g., camera) to stream video feed of the participant during the interaction with other users). The different sessions can be joined by users based on devices that support access to the different sessions. In some instances, a VR interactive session can include multiple users that can view a displayed 3D model of an object from a shared perspective in accordance with implementations of the present disclosure.

People can use different user interface applications to access an XR collaboration platform for real-time, high-bandwidth communication and real-time groupware to synchronously work on assets such as 3D models of objects, interface designs, construction projects, machine designs, combination of 3D and 2D data, among other example assets. In accordance with the implementations of the present disclosure, an XR collaboration platform can be implemented and configured to enable remote collaboration that can result in a smooth and flexible workflow that is supported by efficient tools that reduce the number of user interactions with the collaboration application, as shared content will be presented from a shared perspective while each collaborating user is able to see the other avatar(s) and where on the shared content those avatars are looking or pointing, thus improving the timeliness and efficiency of the process flow.

In some implementations, the XR environment can be accessed through VR devices such as a VR headset, a head-mounted display, a smart phone display, or other devices, and a VR display can present a cooperative XR environment that can be rendered to multiple users wearing VR headsets to provide them with an immersive experience in a 3D space where assets are shown in a shared perspective mode. For example, users can collaborate over a 3D model of an object that is rendered in a review mode within the cooperative VR environment to multiple users by rotating the 3D model of an object according to the frame of reference of the respective user.

In some implementations, an avatar's frame of reference can be established upon entry of the avatar in a shared perspective mode with one or more other avatars. The establishing of the frame of reference can be performed by using position information from a tracked pose at that time of entry for the first user. In some cases, the user of the avatar that is in the shared perspective mode can continue to move their head around thus changing the tracked pose, thereby changing the rendering perspective slightly. However, a certain threshold range for such movements and changes to the pose can be established as to allow the user to move while still continue to be part of the shared perspective mode. By slight movements of the head, the view of the avatar may slightly change without the avatar exiting the shared perspective mode.

In some implementations, the users can be represented in the XR environment by displaying avatars that can be rendered as different types of avatars (e.g., 2D or 3D avatars having different shape, color, annotation, etc.). For example, the type of an avatar that can be used to represent a user may depend on the type of device the user is using to connect to the VR environment, based on settings defined for the users (e.g., gender, age, selected look, etc.), or based on current interactions or instructions performed by the user in the XR environment (e.g., determined that the user is the active speaker, user selection of a button to modify their avatar, etc.). The XR environment can be configured to receive input and/or user interaction from VR controllers that are connected to one or multiple computer devices of the users via wired or wireless connections. The users that interact with the XR environment can be evaluated to determine whether they are authorized to access and view a shared asset in the XR environment.

FIG. 1 shows an example of a system 100 usable to support collaboration between users that share a view of assets in a shared perspective mode configured in an XR environment. A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112, including VR programs, AR programs, conference call programs (e.g., video conference call programs, audio conference call programs, or a combination thereof), which support view sharing and editing functions.

The computer 110 includes an application 116 that includes implemented logic to allow users to interact with shared content in a VR space. For example, the application 116 can help users that are involved in a common task (e.g., working a common shared 3D model in parallel and/or synchronously) to achieve their goals by providing them with a shared perspective view of the shared content. The application 116 can be groupware designed to support group intentional processes and can provide software functionality to facilitate these processes.

The application 116 can run locally on the computer 110, remotely on a computer of one or more remote computer systems 150 (e.g., one or more third party providers' one or more server systems accessible by the computer 110 via the network 140) or both locally and remotely. In some implementations, the application 116 can be an access point for accessing services running on an XR collaboration platform 145 that supports viewing of shared data, e.g., object model data stored at a database 160 on the XR collaboration platform 145, and/or other assets in an XR environment (e.g., structures, textures, avatars of users, other objects or portions thereof).

In some implementations, the application 116 can obtain a 3D model 161 (e.g., an architectural design document, a construction design, floor plans, etc.) from the database 160. The 3D model data as stored at the database 160 can be accessed as a single source of truth when providing representations of the model in the various review modes to users in an XR environment. In some implementations, the database 160 can store multi-dimensional document data including charts, spreadsheets, diagrams, 3D models, image data, floor plans. In some instances, displaying data including content of an XR environment on the display device 120 for generating a view for the user 190 can be based on obtaining 3D and 2D data from the database 160.

A user 190 can interact with the application 116 to initiate or join an already initiated XR environment (e.g., a computer-generated representation of a physical world including a physical and a pseudo structure, such as an architect's office, representing a collaboration space or a representation of an interior space of a physical structure such as a building) to view the shared asset 130, such as a 3D model 161, and share the same perspective view with other users associated with the XR collaboration platform 145 and the XR environment. In some implementations, the application 116 can provide a user interface 132 (e.g., including a portion of the shared asset that is presented in a review mode) on a connected display device 120 to display the shared asset to a set of users in a shared perspective mode. The rest of the user(s) can receive a shared view of the asset at different instances of the collaboration application 116. The shared view can be provided by rotating the shared asset when generating the view for each of the users in the shared perspective mode or by moving the viewpoint of the users (e.g., when they have a spatial distance between them that is below a certain threshold) to match a single frame of reference, while at the same time providing a multi-user experience to each of the users by rendering the other avatars with a spatial distance from each other and a respective orientation corresponding to the particular user viewing. The presentation of other users can be performed by rendering their avatars with an offset based on the shared frame of reference or the shared viewpoint for a stack of users viewing the XR environment.

In some implementations, the application 116 can be operated using one or more input devices 118 of the computer 110 (e.g., keyboard and mouse). Note that while shown as separate devices in FIG. 1, the display device 120 and/or input devices 118 can also be integrated with each other and/or with the computer 110, such as in a tablet computer (e.g., a touch screen can be an input/output device 118, 120).

Moreover, the computer 110 can include or be part of a VR or AR system. For example, the input/output devices 118, and 120 can include VR/AR input controllers, gloves, or other hand manipulating tools 118a, and/or a VR/AR headset 120a. In some instances, the input/output devices can include hand-tracking devices that are based on sensors that track movement and recreate interaction as if performed with a physical input device. In some implementations, VR and/or AR devices can be standalone devices that may not need to be connected to the computer 110. The VR and/or AR devices can be standalone devices that have processing capabilities and/or an integrated computer such as the computer 110, for example, with input/output hardware components such as controllers, sensors, detectors, etc. The VR and or AR devices, either connected to the computer 110 or being standalone devices that integrate with a computer (with processor and memory) can communicate with the XR collaboration platform 145 and immerse users connected through these devices into a virtual world where 3D models of objects can be presented in a simulated real-life physical environment (or substantially similar environment) from a shared perspective and users are represented with respective avatars to replicate real-life interactions.

In some implementations, the system 100 can be usable to display data from 3D and 2D documents/models that can be used to generate an XR environment presented in a corresponding interface on the display device 120 (which can be a VR environment for one or more first users, an AR environment for one or more second users, and a non-VR-or-AR environment for one or more third users) that allows users to use the data to navigate, modify, adjust, search, among other interactive operations that can be performed with the data presented in the 3D space of the virtual world.

In some implementations, users including user 190 can rely on different rendering technology and different user interactive input/output environment to connect, access, and interact in the same virtual world as the one that can be displayed by system 100. Thus, the XR collaboration platform 145 can support interconnected user interfaces that can render a virtual world where multiple users interact, either at the same geo-location or at remote locations.

The XR collaboration platform 145 can be a cloud platform that can be accessed to provide cloud services such as visualization services 147 related to data visualization in different review modes and can support tools and techniques to interact with the content to navigate and modify the content in a shared perspective mode in a cross-device setup when the data from the database 160 is accessed from multiple points associated with different devices. Users can be provided with views in the XR environment, where an asset in the XR environments can be presented from a shared perspective to groups of users at the same time. In some cases, users interacting with the virtual world can render the view of the user 190 through different types of devices that support different graphical rendering capabilities. For example, some users can be provided with a display of the presentation of the virtual world via VR devices, others through AR devices, yet others via desktop displays, laptops, or types of devices. It should be appreciated that the user's view of the shared asset on the user interface 132 can change while the user is viewing the asset, e.g., based on other users manipulating, interacting, modifying, or otherwise changing the view of the asset (e.g., movement of an avatar of another user in the shared mode viewing).

The systems and techniques described herein are applicable to any suitable application environment that can graphically render any portion of the virtual world, including the objects therein. Thus, in some implementations, the XR collaboration platform 145 supports view sharing in the same-perspective mode while maintaining the presentation of avatars of other users in the shared view that are kept spatially distant, for example, as described in relation to FIGS. 2A, 2B, 2C, 2D, 3, 4, 5A, and 6A.

FIG. 2A shows an example table-top review mode provided for display to multiple users accessing an XR environment 200 through different devices that view an asset 210 in a shared perspective mode in accordance with implementations of the present disclosure.

In some implementations, users can access an XR environment through a system such as the system 100 of FIG. 1 and the asset 210 that is viewed by the users can be obtained from a database of an XR platform such as the XR collaboration platform 145 of FIG. 1.

In some implementations, a user can generate, create, or upload a model of an object at the XR application that can be accessible through various access points, such as different user interfaces that can be accessed via desktop devices, mobile devices, VR devices, AR devices, etc. The model of an object can include a 3D geometry, metadata, and 2D floorplans of an object, such as a construction site, a building, and architectural design construction, among other examples of technical construction and/or design data for construction or manufacturing projects. There can be multiple hierarchies defined for models of objects, based on the spatial distribution of the model (e.g. bounding volumes of each part of the model, starting from the outside), but also on the metadata (e.g. building→floor→room, or column-→joist→floor, etc.)

In some instances, using sensors on the headset of a user interacting with the XR environment, the XR collaboration application can map the user's real-world desk to their virtual desk within the XR experience when displaying one or more 3D models. This will act as (passive) haptic feedback to facilitate hand-based interactions with their personal virtual desk. The user can authenticate into a cloud system where their architectural model is stored or at the XR application when the model is accessible (e.g., as stored at a storage device of the XR application or at an external storage device communicatively coupled to the XR application). The virtual desk allows the user to browse the cloud storage or another storage accessible from the VR interface (e.g., hubs, projects, folders, etc.) and select a model (uploaded by the user or by another user but still accessible) for review in the XR space.

In some implementations, when the 3D model is presented in a table-top view as shown at FIG. 2A, a portion or all of the 3D data related to the model can be downloaded and used for the rendering. For example, the different level of detail that is relevant for rendering the 3D model can affect the amount of data that is downloaded for the data visualization. The users that interact with a virtual world of the XR environment can be rendered to represent a physical world where the table-top review mode and/or other modes of the 3D model of an object are displayed and can be seen as avatars within the respective representations of the virtual world provided to each user based on the interface input and output devices used to participate in the virtual world (e.g., a VR device can be used to participate in a VR experience, while an AR device such as an IPAD can be used to render the virtual world on the screen of the IPAD as display streaming to connect the VR experience of the users on the VR devices with the user on the AR device). The connection of the users through different user interfaces supports the XR collaboration experiences over different types of devices that are configured to access the XR collaboration platform (e.g., the XR collaboration platform 145 of FIG. 1.) and participate in a virtual collaboration that is rendered with rendering tools and techniques corresponding to the devices used by the users and viewing characteristics of the review modes on those devices. The viewing within a collaboration session between users can be performed based on rendering of content of the XR environment from a shared perspective view while maintaining the spatial distance between the users, and the experience of the user for a multiple user activity can be maintained.

In some implementations, the table-top review mode allows users to be immersed in a virtual world that can simulate a conference-style set up around a doll-house scale model on a central pedestal. Users can bring in any 3D model from the XR collaboration platform (e.g., a cloud storage, database, or hard-drive, among other example storages) to review here in this review mode. Further, the user interface of the VR environment can include a white board visualized on the virtual walls that can present 2D data related to the model of an object that is presented in the table-top review mode in the middle of the virtual table (on the central pedestal).

In some implementations, users may want to collaborate over an asset that can represent content such as a 3D model of an object that can be shared in the XR environment 200 with a group of users. If the users are provided with a view of the 3D model of the object as they enter the XR environment, each user will have a different view of this 3D model that can match their pose, for example, as identified by the respective user devices they use to access the XR environment (e.g., goggles, VR headset, controllers, sensors, etc.). If the view is provided based on position of the avatars of the users in the XR environment, the users will have different views of the 3D model when their respective avatars are at different positions with respect to the 3D model in the XR environment. Thus, even if users are provided with options to view content in the XR environment 200 and they can see one and the same object, they will have a different perspective for those views and thus the content they see would differ. For example, such difference in the perspective for viewing may not be desired when a group of users work in a 3D space and want to review and manipulate an object in a collaborative work task.

To address such drawbacks of sharing view of assets without providing a shared perspective, the XR environment 200 can support a shared perspective view mode for a group of avatars of users that want (or are defined) to share the view of an asset in the XR environment 200. In such implementations, each of the users will be presented with the same perspective view of the asset 210, which can be the view of one of the users in the group, or can be a view that can be pre-configured as a view for sharing with a common perspective with users. For example, some assets may be assigned with a "best" perspective view that can be used as a default perspective to share with other users in the XR environment 200. When the perspective is shared, a view for each user is generated using the pose of the user that is tracked based on their device (e.g., 3D position and orientation of the headset used by the user to enter the XR environment 200) and a perspective transformation applied to the shared asset 210 based on the shared frame of reference for the asset 210 (i.e., the particular perspective-view that is shared) and a frame of reference established for the avatar of that respective user. The view for each user can be generated and rendered to a user's display device as shown at FIG. 2B.

Figure 2B:
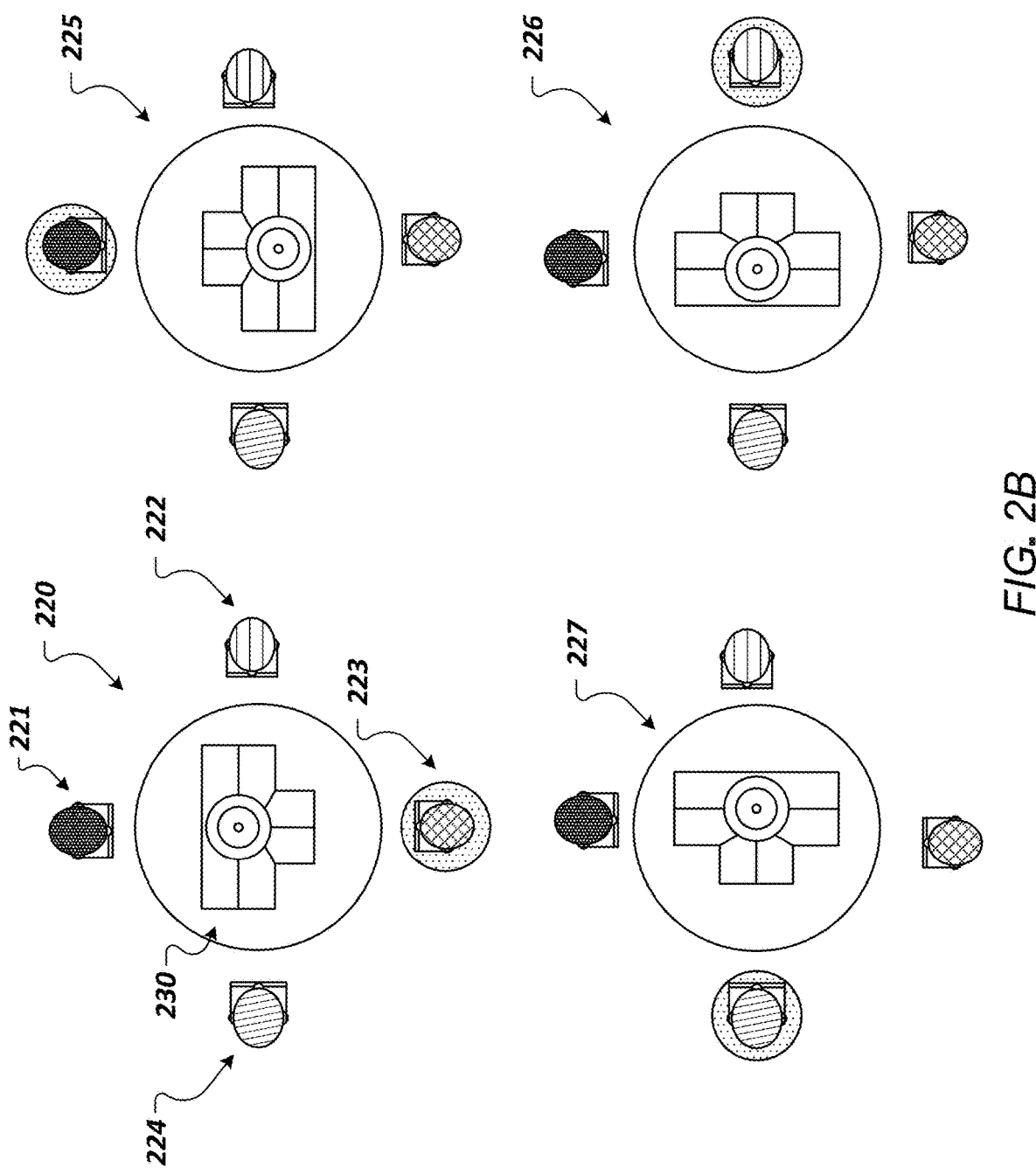
FIG. 2B shows an example reorientation of an 3D object in a table-top review mode provided for display to four users accessing a XR environment through different devices that view an asset in a shared perspective mode in accordance with implementations of the present disclosure.
Figure 2C:
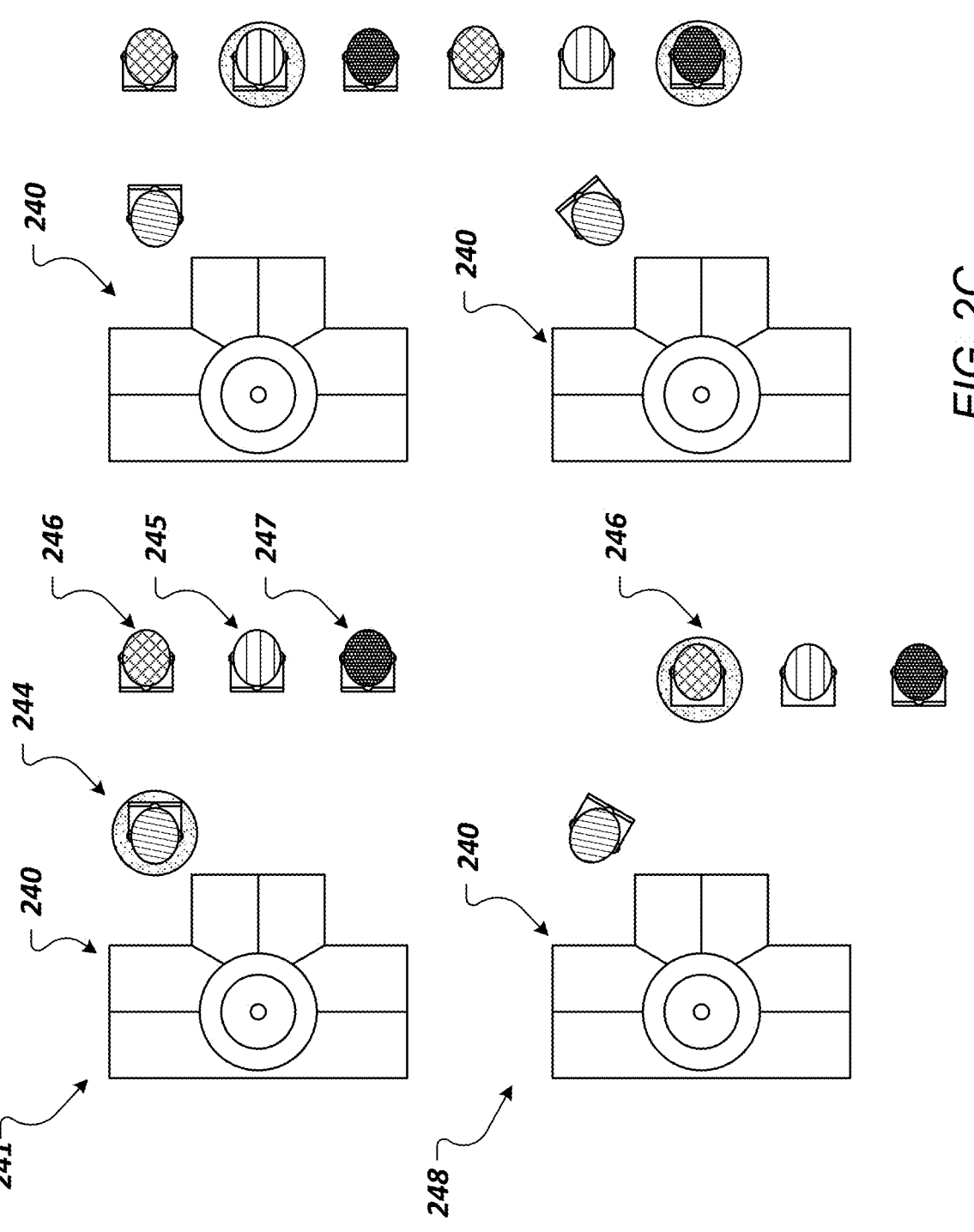
FIG. 2C shows an example viewing mode provided for display to multiple users accessing an XR environment through different devices that view an asset in a shared perspective mode in accordance with implementations of the present disclosure.

FIG. 2B shows an example perspective transformation of a 3D model of an object in a table-top review mode provided for display to four users accessing a XR environment through different devices that view an asset in a shared perspective mode in accordance with implementations of the present disclosure. Perspective transform can be applied to the 3D model so that each respective user has a shared perspective mode where the 3D model is reoriented (e.g., a rotation about a single axis in the simple tabletop view mode, or rotations about more than one axis is applied) and/or repositioning of the content is performed (e.g., as shown in the example of FIG. 2C below). When users enter an XR environment as a collaborative space substantially similar to the XR environment 200 of FIG. 2A, each user has their own viewpoint that is discrete and matches their view into the XR environment (their viewpoint and view orientation). The viewpoint is a location of an avatar in the XR environment, and this location can be changed based on user input, for example, based on the user moving in the physical world, based on user joystick input, based on the user pointing at something in the XR environment and clicking a button to reposition the avatar within the XR environment, etc. The view orientation of the avatar is the 3D direction of the view into the XR environment. In some instances, such view orientation can be changed based on user actions such as when the user moves their head around while wearing a VR headset, or based on other user instructions.

To provide an experience in this XR environment (e.g., VR or AR environment) where the view of a rendered asset is maintained from the same perspective for all users (e.g., like a conference video call where a display is shared and it is maintained the same for all participants at the same time), a shared perspective with regard to the asset that is being viewed can be defined, while still having different spatial relationships among the avatars of the users which are experiencing the shared viewing. The shared perspective can be managed such that each avatar is provided with a combination of a fixed perspective to the content that they are viewing (the asset) and still a variable perspective to the avatars (people) each one is viewing the asset with.

For example, at FIG. 2, four users, 221, 222, 223, and 224, are provided with a table-top review mode of an asset 230 that is a model of an object. The users enter a shared perspective mode when viewing the asset 230, which is viewed by each one of the four users from the same perspective.

The shared perspective mode can provide a shared viewpoint of the asset (e.g., a 3D model of an object) to multiple users, in this case four users in a virtual environment. As such, at 220, which is the view of the user 223, the asset 230 is viewed by the user 223 from a given perspective, which can be defined as the perspective that is to be shared with the other three users 221, 222, and 224. Thus, such perspective view for the asset 230 can be provided at views 225, 226, and 227 of the other three users. In the example of FIG. 2B, a circular table and a 3D model on top of it is surrounded by avatars of users. To provide the shared perspective mode, the model is rotated about the table's axis, enabling all users to view the model from the same angle. To provide the users with the same perspective view as shown at each of 220, 225, 226, and 227, the asset 230 is rendered at each of the views by applying a perspective transform based on the shared frame of reference, i.e., the frame of reference of the user 223. Each of the views 220, 225, 226, and 227 are associated with a different user from the four users at the table-top review mode. In can be understood that while the four users are together in the XR environment and they have a shared perspective mode, each one of them will have the view as shown at 220, 225, 227, 226 with regard to the asset 230. In such scenarios, the transformation of the model to be rotated towards each respective user can be performed based on transformation operations that facilitate the model's rotation. For example, the center of the table can be taken as the center of reference (the (0,0,0) position for the XR environment). The rotation of the model can be considered as a 2D problem, since during the rotation the upward direction remains constant. Further details for the execution of the transformation are provided in relation to FIGS. 4A and 4B.

With the shared perspective mode, all users from their subjective viewpoint can look at the asset shared in the XR environment from the same direction (to provide the same perspective view), while at the same time they are provided with a spatial relationship relative to each other in the group that matches their real-world physical position. When the users interact with the shared content, they can point to the shared asset. When a user points to an asset in the shared perspective mode, the other users are able to see the pointing of the first user in a way that resembles their pointing but that is directionally offset from their hands or posture in the physical world to align with their relative position in view of the first user viewing. Users in the XR environment are rendered based on technical details gathered for the users including their pose and interaction with content in the virtual world. These technical details are used to create a custom rendering of a representation of the XR world for each individual that provides shared viewing for an asset in the world, while also allowing viewing of users in the XR world that includes presenting users' avatars and showing their gestures.

FIG. 2C shows an example viewing mode provided for display to multiple users accessing an XR environment through different devices that view an asset 240 in a shared perspective mode in accordance with implementations of the present disclosure.

In an auditorium, if multiple users are positioned one next to the other, even if they are close, the best viewpoint is provided only to the one person whose perspective matches the dead center on the 2D screen where the asset 240 is presented. To give each user the experience of viewing from the dead center of the screen while also maintaining the look and feel of viewing the screen from an auditorium where there are other users, it can be possible to rotate the asset 240 as discussed in relation to FIGS. 2A, 2B, and 4, or the asset 240 may be kept fixed for the presentation while the avatars' viewpoint of each of the users can be moved and aligned with a particular shared perspective. In the example of FIG. 2C, the shared view can be the one that the user 245 in the middle is experiencing, and each one of the other users 246 and 247 that are next to the central user may have a reoriented viewpoint towards the asset 240. The user 244 in this particular example can be a presenter in the case that this auditorium is used as a workshop space where the user 244 presents materials to a group of users 245, 246, and 247. When the three avatars 245, 246, and 247 in the XR environment as shown at scene 241 enter a shared perspective mode, the viewpoint of the avatars will be changed, and for example, the avatar of user 246 would have a changed viewpoint to match the viewpoint of the avatar 245 as shown at the scene 248 . . . . In the scene 241, the viewpoint of the avatar 245 is shared with the avatar 246 and the 247. For example, the viewpoint for sharing can be in determined based on identifying the viewpoint corresponding to a "best" viewpoint for the asset 240. When the avatars are about to enter the shared mode, each of the avatars 245, 246, and 247 is repositioned to the shared viewpoint (in the example this is the middle seat matching with the position of the avatar 245) for generating the display output for their respective users. In such manner, each of the users will see the asset 240 from the same viewpoint without changing the position of the asset 240. Further, the avatar 244 is presented with a perspective transform in the view of the avatar 246 at scene 248, such as the user corresponding to the avatar 246 and respectively the avatar 248 that corresponds to the same user but has the changed position when the shared perspective mode for the asset 240 was entered. The avatar 244, when displayed in the view of the avatar 246 (in the shared mode 248) will be rendered in a transformed way as it is viewed from the shared viewpoint by the avatar 246. Since the avatar 244 is oriented to look towards the avatar 246 at scene 241 (in view of the relative position of the avatar 246 and the avatar 244 prior entering the shared perspective mode at scene 241), the avatar 244 is reoriented and looking at avatar 246 at the scene 248 in the shared mode. In such manner, each avatar 246, 245, and 247, in their shared perspective views after entering the shared mode, is provided with a display of the avatar 244 that has a different view orientation with respect to the asset 240.

In this example, the viewpoint of the avatar of the user 246 would be changed, as shown at scene 248, and this will be associated with a modification of the representation of the avatar of the user 244 (the presenter) so that the avatar 244 as an asset in the XR environment would be offset to align with the change in the viewpoint of the user 246 in his new viewpoint in scene 248.

It should be considered that moving the viewpoint of an avatar in a VR/AR experience can be associated with the creation of motion or VR sickness for the user associated with that avatar. Thus, moving around the position of an avatar can be done within a certain threshold range of movement and reorientation that would reduce the chances of creating such VR sickness. However, movements of a user's camera while in an XR environment are not completely in the control of the system, since the user also makes movements, however, the changes in the positions of the user that can be made to provide a shared perspective view of an asset can be controlled within certain boundaries to leverage between aligning the views of the users and avoiding VR/motion sickness. In some implementations, the position of the avatar can be moved though execution of a teleportation of the avatar from one position to another to improve the experience of the user and to reduce the motion sickness which may be created if the repositioning of the avatar has to be done within a distance above the threshold range.

In some implementations, while the user is viewing in the XR environment and is part of a shared perspective mode, the user can move their head around (e.g., in the 3D space) and/or move their position a little. Such movements of the user can be detected as part of tracking the pose of the user or based on receiving information for the tracked pose of the user while staying in the shared perspective mode. During the shared perspective viewing experience in the XR environment, the user may continue to change their pose (position and orientation) and the rendering of the view of the XR environment can be updated in real time or close to real-time, thus avoiding VR sickness. In some cases, the positional movement of the avatar within the XR environment can be big enough, for example, repositioning outside of a threshold range around the position associated with the shared perspective mode. In those cases, the avatar can be removed from the shared perspective mode. For example, if an avatar of a user wants to exit a shared perspective mode, the user can provide instruction for repositioning of the avatar to a location outside of the defined threshold range or perimeter to "jump" out of the shared ode. In some cases, if a user had made changes to their position and/or orientation while in the shared perspective mode and afterwards had a period of time where not moving and is still in the shared perspective mode with his avatar and together with other avatars of users, based on detecting that the user is not moving, the rendered view for the user can be readjusted and the system can slowly pull the rendered perspective for the user back to the shared perspective which was changed due to the change in position/orientation.

Figure 2D:
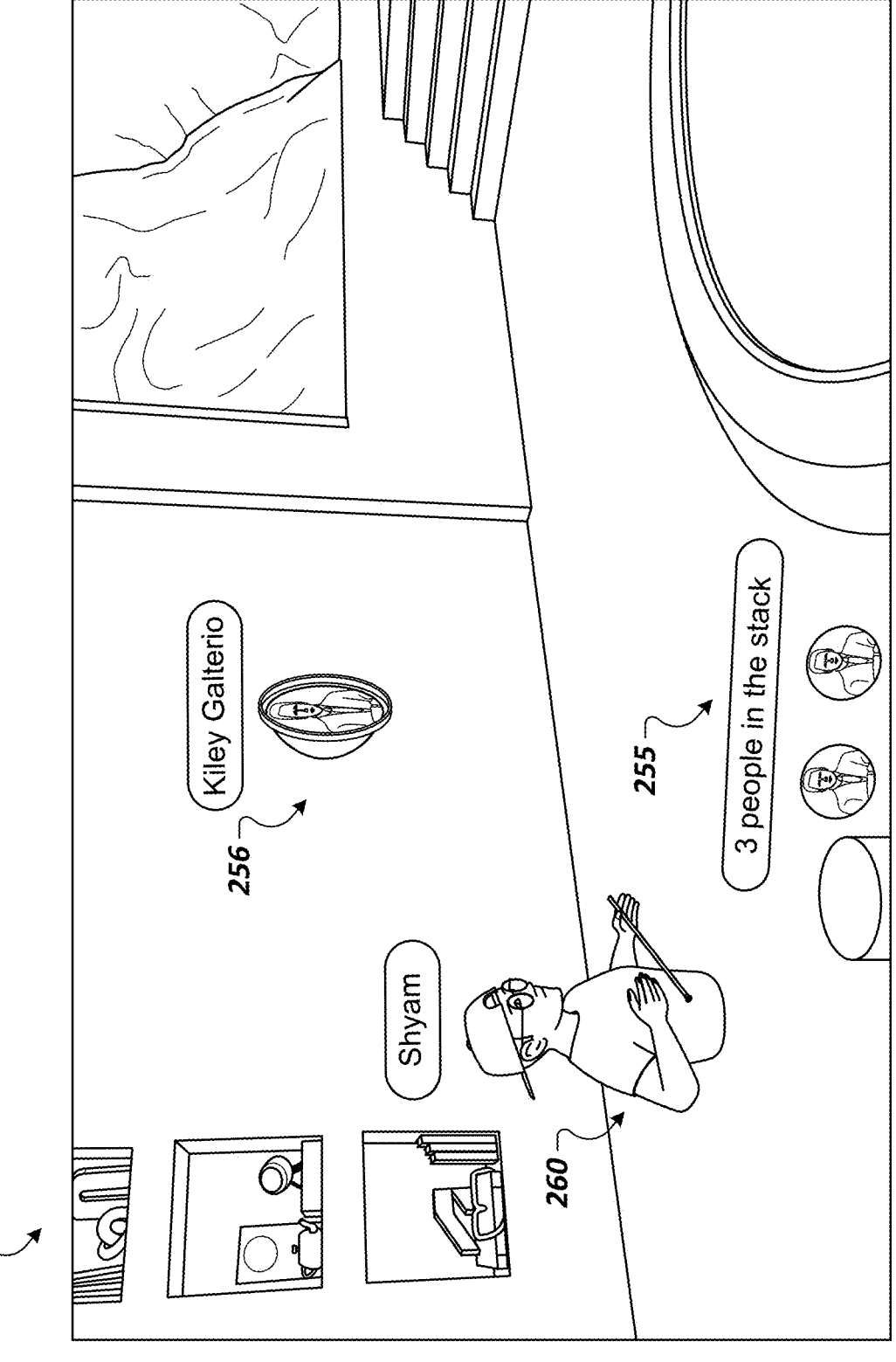
FIG. 2D shows an example viewing mode of a user interacting with an XR environment providing options for joining a shared perspective mode of an avatar stack in accordance with implementations of the present disclosure.

FIG. 2D shows an example viewing mode of a user interacting with an XR environment 250 providing options for joining a shared perspective mode of an avatar stack in accordance with implementations of the present disclosure.

The XR environment 250 can be accessible to be joined by multiple users. The users can join the environment through VR and/or AR equipment and can be provided with options to view XR content in different review modes, such as from a table-top review mode as shown in FIG. 2A, that allows the review of XR content from outside or an inside review model (e.g., a one-to-one scale review mode within an object such as a house). The XR environment 250 can be configured to support a shared perspective mode that can be initiated when users are viewing XR content in a particular review mode. For example, if an XR object is rendered in the XR environment, two users can be grouped to have a shared perspective view of the XR object where they can look into the object in a table-top review mode.

In some implementations, groups of user avatars can have a shared perspective mode, where the avatars can be grouped based on identifying that the distance between their position in the VR space is within a certain threshold. When avatars are identified to be close to one another (e.g., within a threshold distance), they can be prompted to elect to enter into a shared perspective mode. In some implementations, the shared perspective mode can be generated to render views for the users that present the XR content from the same viewpoint. In some implementations, the XR content is rendered from the same perspective since the viewpoint of each avatar from the group is the same, and the rendered view of a user is generated by applying a perspective transform to other avatars of other users so that the other avatars (having the same viewpoint) are still viewable within the view of the other users. Thus, the spatial relations between the avatars are maintained by providing an avatar stack that allows each user to experience a multi-user activity where there are other avatars participating in this viewing.

At FIG. 2D, a user with a 3D avatar 260 named Shyam is navigating within the XR environment 250 and can be presented with views of other user avatars that are part of the XR environment 250. During interactions and/or navigation in the XR environment 250, groups of avatars can be formed, such as the group 255 that includes three users and is presented as an avatar stack of three avatars (users), which collaborate in a group. Such a group 255 can be a group that shares the same perspective view when viewing an asset (such as an XR object) by having their viewpoint repositioned for them to enter the stack, while at the same time, in their respective views, the users in the group 255 can see each other's avatars in a transformed way, offset to align with the change in the viewpoint of the respective user due to this repositioning. The avatar 260 is provided with a view of the group 255 as an avatar stack object including multiple avatars of users, so that the avatar 260 can view the avatars that are grouped without sharing their viewpoint. As such, the avatar 260 is provided with an outside (or third-party) view of an avatar stack and the avatar 260 can join the avatar stack group 255 by repositioning closer to the group, or by having the user of the avatar 260 provide instructions to jump into the location of the group 255 and to be provided with the shared view of the other avatars in the group 255.

In some implementations, the avatar 260 can be provided with a view of the position of the avatar stack, where the avatars can be shown as 3D avatars and their position and orientation can be aligned and offset to align with their perceived orientation towards the shared content in the shared perspective group. In some implementations, the avatar 260 can be provided, in his view, with a display of an avatar 256 of another user in the XR environment. The avatar 256 is represented as a 3D avatar (as a hemisphere including an icon and labelled with a name) that is associated with a position and orientation in the XR environment. In some implementations, the avatar 260 and the avatar 256 can enter into a shared perspective mode (e.g., an avatar stack mode as for the group 255) that can be associated with a shared frame of reference in the XR environment where the two avatars will be repositioned to a shared viewpoint (e.g., by teleportation or otherwise repositioned) to enter the shared perspective mode. In the case where the shared perspective mode has been entered by the avatar 260 and 256 and associated with the shared viewpoint, a view of the XR environment displayed for the avatar 260 can be generated by applying a perspective transform to the avatar 256 based on the shared frame of reference. In this manner, the avatar 256 is displayed in the view of avatar 260 even though the two avatars are associated with the same position in the XR environment. The avatar 256 as rendered at the view of the avatar 260 has a position that is offset and is reoriented to compensate for the adjustment resulting from the offset.

In some implementations, in response to identifying that the avatar 260 moves or navigates (e.g., transports, jumps, or else) to a location in the XR environment that is within a threshold distance from an area in the XR environment occupied by the avatars in the shared perspective mode, it can be identified that the avatar 260 has entered (or has provided an indication to request to enter) the shared perspective mode with the group 255. When the avatar 260 joins the shared perspective mode, rendering of a new fourth user's view can be performed to the display device of the user of the avatar 260 by repositioning the viewpoint of the avatar 260 to match the single frame of reference relevant for the shared perspective mode of the group 255 and by applying a perspective transformation to avatars in the shared perspective mode based on the single frame of reference, a frame of reference established for the avatar 260 (e.g., frame of reference associated with the viewpoint of the avatar if that was not adjusted and moved to the shared viewpoint), and respective frames of reference established for the avatars in the shared perspective mode.

In some implementations, if an avatar from the group 255 initiates movement or navigates to another location in the XR environment that is outside the threshold area defined for the shared perspective mode for the avatar stack 255, the avatar can be identified as leaving the shared view and thus a new user view for the user associated with that avatar can be generated and rendered. The new user view can be generated by repositioning the viewpoint of the avatar that moved away to match to a frame of reference established for the avatar based on the user's device and the new location.

In some implementations, avatars that navigate within an XR environment and interact with content can teleport into already defined avatar stacks and even if an avatar moves, the avatar does not have to leave the avatar stack and the shared perspective view. The movement can be allowed within a threshold distance or a predefined area.

In some implementations, when avatars are identified as occupying the same space, they can be automatically stacked into an avatar stack and then other avatars can join the group or one or more of the avatars can move away from the stack. In some implementations, the stacking and unstacking can be performed based on navigation of the avatars within the space and identification of their location and relative distance.

Figure 2E:
FIG. 2E shows an example interaction of an avatar with a pointer towards an asset rendered in a shared perspective mode in accordance with implementations of the present disclosure.

FIG. 2E shows an example interaction of an avatar with a pointer towards an asset rendered in a shared perspective mode in accordance with implementations of the present disclosure. In some implementations, the example interaction as presented in relation to FIG. 2E can be performed in the context of rendering an asset in a shared perspective mode where a perspective transform is applied to the asset as described in relation to FIG. 2B.

For example, when one avatar of a user 270 points with his hand to a location on the model of an object, another user in the group, i.e., user 275, may not be able to understand (or see properly because it may be in a hidden location) what the location on the object is unless the second user has a perspective that includes the location (e.g., the second user will not see the location if the first avatar is pointing to the back of the building and the second user is viewing the front of the building).

In some implementations, such differences in perspective may not be desired when the "best" viewpoint for presenting a model of an object is a particular viewpoint and it may be impractical that all users are physically positioned at the same spot. For example, there can be a "best" seat at a movie theater and only one user may have the "best" view perspective when viewing content in an XR environment. To address such downsides and/or limitations when sharing content in an XR environment, a shared perspective view can be generated as shown at FIG. 2E, where a group of users have respective views that are created by rotating the content (the object on the table) to match the perspective of the user in the 3D space. In some cases, the perspective of the users relative to the content rendered in the XR environment can be moved, for example, as shown in FIG. 2C.

In some implementations, to provide shared perspective view to the users that are associated with viewing a given asset (e.g., XR content such as object(s), structure(s) or groups thereof, or an avatar of another user) when users enter a shared perspective mode, a respective user's view can be generated and rendered at the respective device of the user. The respective user views can be generated based on a pose being tracked for the user, a frame of reference of the asset that is to be shared, and a perspective transformation applied to the asset.

In some implementations, the content that can be shared in an XR environment includes assets that can be XR objects or avatars of users. The XR object can include a "computer model" (e.g., a 3D model of an object) that can be rendered for viewing from different perspectives inside and/or outside of the assets.

In some implementation, when avatars of users are in a shared perspective view, a view of a first user can include other avatars of users that can be rendered with an offset position in a view and their orientation can be adjusted to compensate for the offset of the position. In some implementations, during a collaborative activity between users having their avatars sharing a shared perspective mode, the users may provide instructions for the avatars to interact with the rendered 3D content, for example, to point to portions of the content. For example, when avatar 270 is pointing to the object with his hand to point 271 (e.g., based on user provided instructions to initiate the pointing), the avatar 275 can be provided with the same perspective view for the object, where he can see the avatar 270 that is pointing but with a representation 280 that includes a hand that is pointing to the location. In the view of the avatar 275, the hand of the avatar 280 is offset to align with the viewpoint of the avatar 275.

In some instances, the avatars of the users can be rendered based on a pose and perspective of the user established for the XR environment. In some implementations, the shared content can be more than one asset and can include a combination of a 3D model(s) of an object(s) and/or an avatar(s).

Figure 2F:
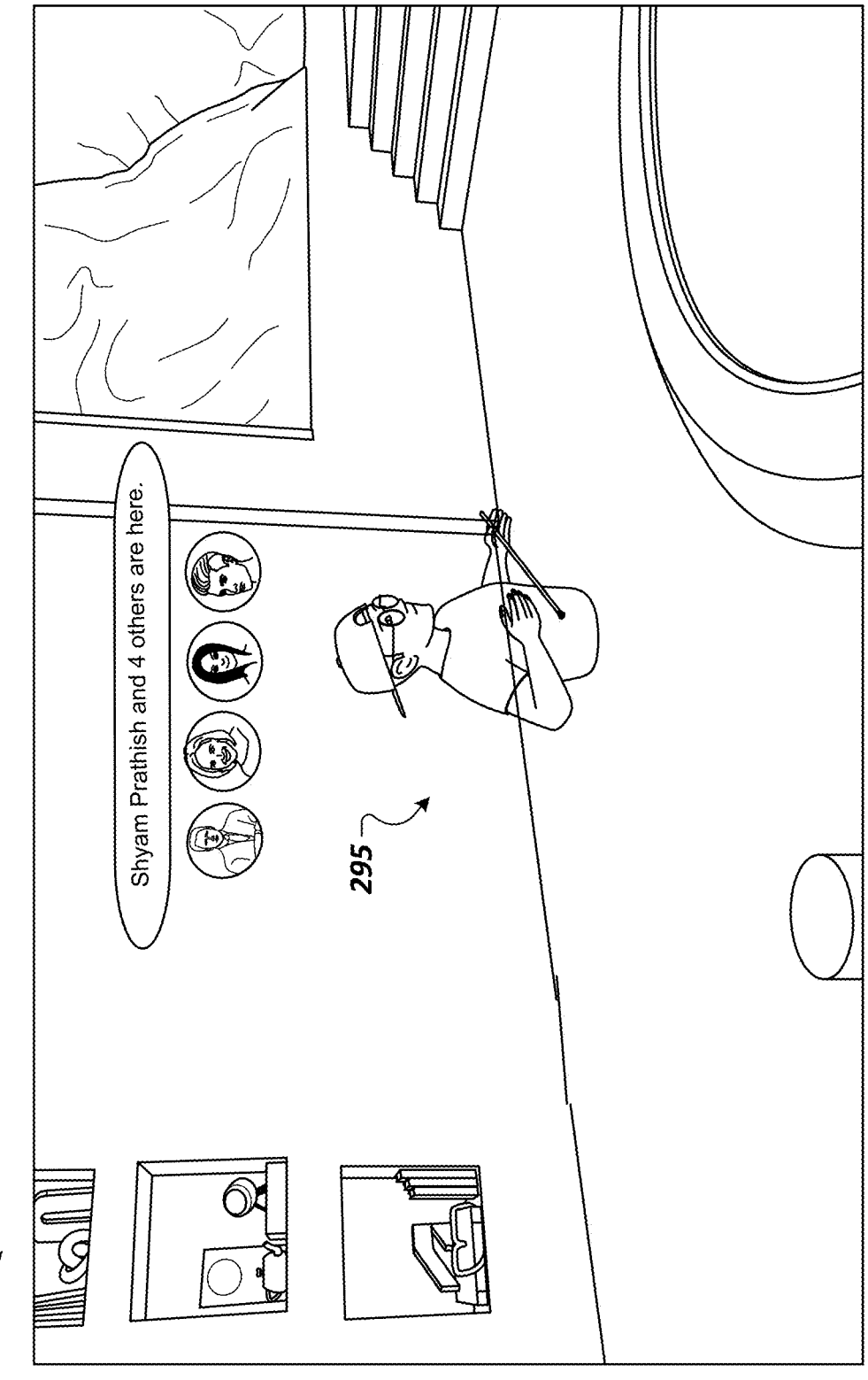
FIG. 2F shows an example user interface of a collaboration application that implements a shared perspective mode in accordance with implementations of the present disclosure.

FIG. 2F shows an example user interface 290 of a collaboration application that implements a shared perspective mode in accordance with implementations of the present disclosure. The user interface 290 shows a third-person view of a formed avatar stack with five avatars, where each of the avatars in the stack can have a shared perspective view into the XR environment (the shared perspective view is not shown). In some implementations, a collaborative application providing mixed XR collaboration experience as discussed in the present disclosure can be implemented to provide a shared perspective view for multiple avatars of users of an XR environment.

In some implementations, the shared perspective mode is implemented to provide a shared view for multiple avatars into the XR environment upon placement of the avatars in a stack. In some implementations, a first avatar of a first user is placed into a stack of avatars in the shared perspective mode with a second avatar of a second user in response to the first avatar being moved to be within a distance threshold of the second avatar of the second user in the XR environment. In some implementations, the movement of one avatar close to or away from another avatar, can be based on requests received from one or more users associated with the XR environment. In some cases, a first avatar in the XR environment can move smoothly to another, second avatar (e.g., based on instructions of the user associated with the first avatar). In some cases, the first avatar can be teleported on top of another avatar, where the teleportation can be performed based on a selection of the location associated with the other avatar, or based on a selection of a name of the other avatar (e.g., from a list of names of avatars of users associated with the XR environment). For example, the teleportation can be performed based on direct instruction for the name of the avatar that may not require a selection from a list but rather can be a voice instruction or other gesture input. In some cases, the movement of the first avatar to another avatar can be based on a request to gather two or more avatars at a location in the XR environment. The location whether to gather the avatars may be defined as a location associated with a particular avatar in the XR environment, or can be defined as an input location defined by one of the avatars that are to be stacked, or by a host avatar defined for the XR environment. In some cases, the stacking of the avatars into one location can be based on an instruction received from a user of the first avatar to be repositioned to another avatar (e.g., requesting to perform an operation "go—to" user that can be provided as a user interactive element at the user interface 290). In some implementations, substantially similar movements based on different requests and/or instructions can be performed so that a user can be moved away from the avatar stack and thus, to exit the shared perspective mode.

Figure 2G:
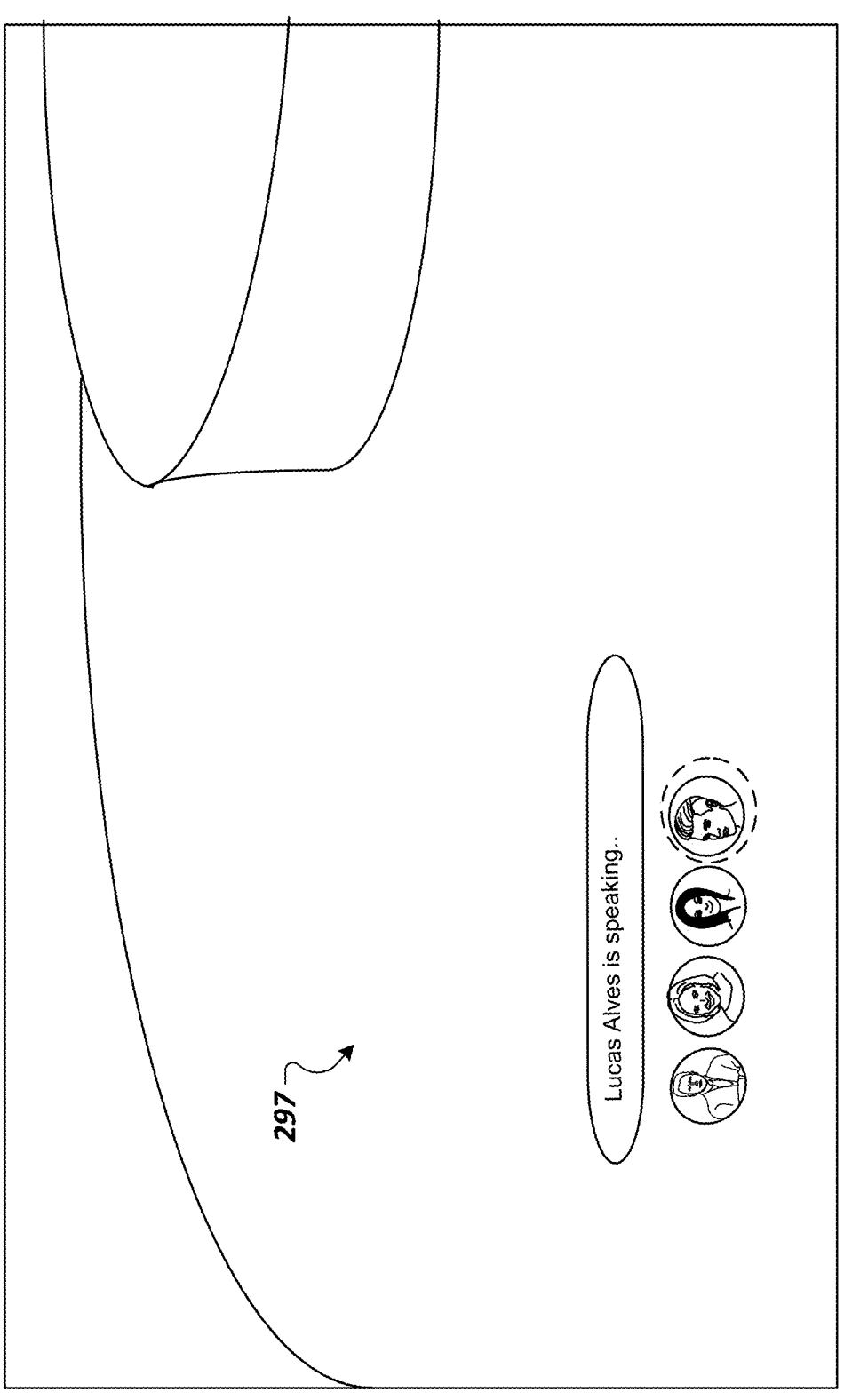
FIG. 2G shows an example user interface including a first-person view from a collaboration application that implements a shared perspective mode in accordance with implementations of the present disclosure.

In the example user interface 290, avatar 295 (names "Shyam Prathish") can be the avatar of the first user, that can be moved to the location of the stack and gathered together with four other avatars as shown. In some implementations, the shared perspective mode in which each user's view generated for each user associated with an avatar of the avatars in the stack includes a graphical representation of each other avatar of the avatars in the stack at a location in each respective user's view. For example, in the view of avatar 295, a graphical representation of the other avatars can be included, e.g., can be positioned at a predefined location in the user's view. In some cases, the graphical representation can include an icon of the avatar, which can be an image or other graphics indicative of the user. More details about the first-person view of the first avatar in the stack into the XR environment are presented in relation to FIG. 2G. In some implementations, the user view of the avatar 295 of FIG. 2F can be as shown in FIG. 2G.

In some implementations, the first avatar of the first user, can be moved from a current location to a location of the stack of avatars at a rate that is slow enough to prevent motion sickness in the XR environment. In some implementations, the first avatar of the first user can be teleported from the current location of the first avatar to a location of the second avatar to join the stack. The teleporting can be responsive to a command received from the first user. In some implementations, an avatar of a user can be teleported to a location of the stack based on a received selection of the avatar by the second user from a list of avatars rendered at a user interface component at an user's view of the second user. In this way, the second user can select to teleport another avatar to be added to the avatars that have already been stacked. The second avatar can determine the avatar to teleport from a set of avatars associated with the XR environment (e.g., avatars within the same experience, same room, or other criterion) that can be identified by name, e.g., presented at the user interface component and selected by the second avatar.

In some implementations, two or more avatars can be gathered into a location of an avatar in response to user input of the second user identifying the two or more avatars to be gathered. For example, an avatar such as the avatar 295 can send an instruction to gather the other four avatars in his location. The other avatars can be selected by the avatar 295, for example, based on a name, or based on a list presenting icons associated with available avatars to join the shared perspective mode. In some implementations, one or more avatars can be dragged away from a current location associated with the stack of avatars to change a shared view of the dragged avatars of the stack into the XR environment. In some instances, the dragging the avatars can be based on movement of an avatar of the stack designated as a host.

In some implementations, in the shared perspective mode, an avatar of an active speaker in the stack is rendered with a three-dimensional model representation of the avatar of the active speaker at a predefined location in each respective user's view. For example, avatar 295 is presented with a 3D model of his avatar to indicate that at that point in time, the avatar 295 is the active speaker in the group of avatars in that stack. The avatar 295 is presented with the 3D avatar representation to be seen from a third-person view of the stack. The 3D model of the avatar of the active speaker is rendered at a location of the stack in user views of other users associated with avatars in the XR environment that are not in the shared perspective mode and for whom the stack is within their field of view. Within a view of a user of an avatar from within the stack, the avatar of the user who is the active speaker can be shown with a 3D model as well to indicate for the avatars in the stack who is the active speaker.

FIG. 2G shows an example user interface 297 including a first-person view from a collaboration application that implements a shared perspective mode in accordance with implementations of the present disclosure. For example, the user interface 297 is of a user from the stack as formed and described in relation to FIG. 2F. The user interface 297 including first-person view of a first user associated with a first avatar which is a shared view within the XR environment by each of the five users associated with the five avatars in the XR environment that are within the stack. The user interface 297 includes avatars of each one of the avatars part of the stack, where each avatar is presented with a distinguishable graphical representation (in this non-limiting example, this is a photograph). The user interface 297 can render the graphical representations of the avatars in the stack at a particular location in the view. For example, they can be ordered in a line or included in a graphical representation of a tray. In some implementations, when a user is speaking, the corresponding avatar of the user can become visually modified, for example, enlarged, highlighted, darkened, decorated, or otherwise made identifiable as a different style of graphical representation compared to the other avatars. In some implementations, and as shown at user interface 297, a user interface text component can be rendered in close proximity to the graphical representation of the avatars where a message is provided to identify the name of the user who is speaking (in this example this is Lucas Alves). In some implementations, and not shown in the user interface 297, a 3D model of the avatar of the active speaker can be rendered at the user interface 297 to indicate who is the current active speaker in addition or as an alternative to any other indications of other avatars shown with graphical representations (e.g., icons with photographs). In some implementations, within the user's view of the active speaker, the avatars of the other users in the stack can be shown and it can be identified that the user is the active speaker, e.g., by a visual text component including a message or through including the name of the user who is the active speaker, or through adding a highlighted indication for an avatar representation of the avatar of the user within that user's view.

FIG. 3 shows an example of a process 300 to provide shared perspective views of assets in an XR environment in accordance with implementations of the present disclosure.

At 310, a first user's view is rendered to a display device of that first user. The first user's view is into an XR environment for example as discussed in relation to FIGS. 1, 2A, 2B, 2C, 2D. The XR environment can include a VR environment, or an AR environment, or a combination thereof. The first user's view is generated using a first pose that is tracked for the first user. For example, the first pose includes a 3D position established for the user device or controller (e.g., headset and/or VR controllers) as well as movement (e.g., up and down, left and right, and rotation) within the XR environment that can be identified by tracking movements of the user device or controller.

At 320, it is identified that a first avatar associated with the first user has entered a shared perspective mode with a second avatar associated with a second user of the XR environment. When a shared perspective mode is entered, the avatars can enter a shared table-top review mode as shown in FIG. 2B, or an avatar stack where avatars of users have their viewpoint reoriented to align with a single frame of reference for viewing an asset in the XR environment, or a 1:1 scale collaboration review mode where avatars of users are immersed in a VR experience where one avatar's viewpoint includes a shared perspective of an asset and/or is provided a view of a tray of avatars that are reoriented for the respective avatar.

Figure 5A:
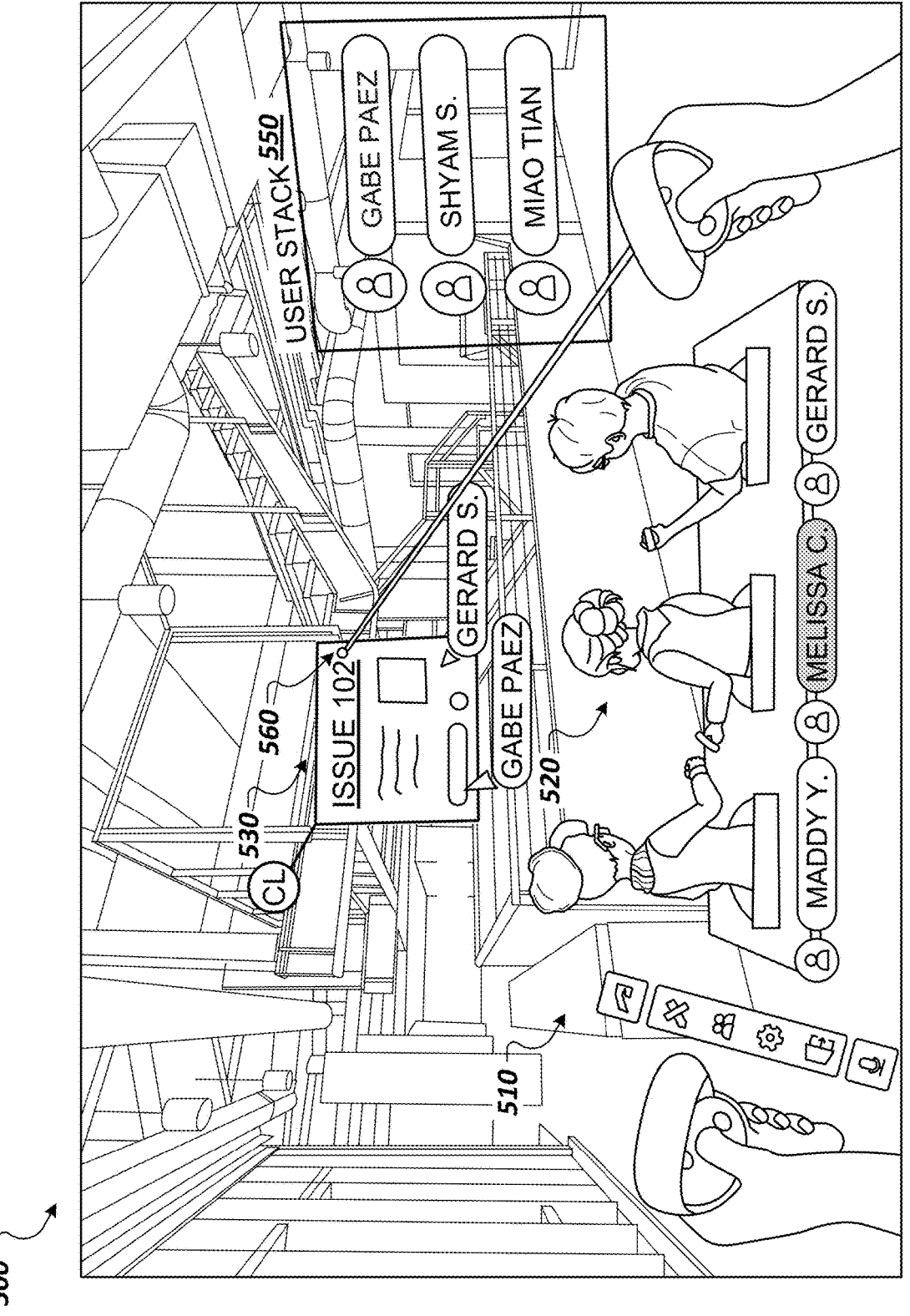
FIG. 5A shows an example of a one-to-one scale collaboration review mode of a user provided with an avatar stack perspective in accordance with implementations of the present disclosure.

When avatars enter a shared perspective mode, they share a view of an asset (e.g., XR object such as a 3D model or an avatar of an individual in the shared mode) that is reoriented for each of the users in the group. In the case where the avatars share a single frame of reference for viewing an object in the XR environment but also are provided with a reoriented view of the avatars of the other users in a tray, the positions of the other avatars are reoriented to adjust their presentation in view of the adjusted viewpoint of the respective avatar in the respective shared view. In such a case, the offsets that need to be performed to generate the view of the avatars for each individual would be different, as the users have different initial points of view that are moved to a common viewpoint (as discussed in relation to FIG. 2C and FIG. 5A). The avatars of users can be presented as shown at FIGS. 5A and 5B, and for each user the avatar gaze and gestures would mimic what the user is performing with the user's devices (e.g., controllers or sensed by user sensors on a headset or else). The shared perspective mode has a single frame of reference in the XR environment that is shared by the first user and the second user.

At 330, rendering to the display of the first user is performed while the users are in the shared perspective mode. The rendering is performed by generating the first user's view using the first pose that is tracked for the first user and a perspective transformation applied to an asset based on the single frame of reference and an additional frame of reference established for the first avatar (e.g., as shown in FIG. 2B) or the second avatar (e.g., as shown in FIGS. 5A and 5B) when the shared perspective mode was entered.

In some implementations, the rendering to the display of the first user can be performed in the context of presenting the asset as reoriented content (e.g., as shown at FIG. 2B). In those cases, the additional frame of reference that is used for the perspective transform to the asset corresponds to a position of the first avatar when entering the shared perspective mode. In perspective transform is applied to the asset so that the asset can be viewed by the first user from the determined shared perspective associated with the single frame of reference.

In some implementations, the first and the second avatar can be part of an avatar stack where the avatars have a shared viewpoint. For the rendered view of the first user, the avatar of the second user can be rendered as the asset in view, where the second avatar can be rendered as a 3D avatar. The perspective transform is applied to the 3D avatar when rendering the view for the first user so that the first user can see the second avatar of the second user, where both avatars are associated with the same viewpoint for the XR environment (stacked at the same point in the XR environment). In those instances, the additional frame of reference corresponds to a predefined offset from the shared position for the avatar stack at the time the shared perspective mode has been entered.

In some implementations, the first and the second avatar can be provided with a shared perspective mode where their view is repositioned, for example, as shown at FIG. 2C. In those cases, the additional frame of reference corresponds to at least the first avatar's position at the time the shared perspective mode has been entered by the first avatar, and the perspective transforms can be applied to reposition the viewpoint of the first avatar and to another avatar that is visible in the view of the first avatar (e.g., has a position in the XR environment that is viewable from the shared viewpoint (e.g., the presenting avatar from FIG. 2C)) so that the orientation of the first avatar towards the other avatar can be relatively maintained to match with the orientation that the first avatar had towards the other avatar before entering the shared perspective mode.

In accordance with implementations of the present disclosure, providing a shared perspective mode for avatars of users in an XR environment can be performed by reorienting content rendered on the display of each user in the shared mode. In some instances, the reorientation can be performed for identified content (such as an XR object that is shared with a group of avatars) for each user in the shared mode. In some instances, the reorientation can be performed for each user individually and for the avatars of other users in the shared perspective mode, for example, as described in relation to FIGS. 5A, 5B, 6A, and 6B.

In some instances, an avatar stack as a stack of 2D and 3D avatars can be presented in a user's view to identify that the user who is viewing is performing the viewing in a group setup. The avatar stack can be considered as an asset that can be presented for each individual user's view where reorientation has to be applied differently for each avatar to offset for the viewpoint of the avatar that is viewing the XR environment (e.g., the view can include an XR object in a 1:1 scale review mode or a table-top review mode for a 3D model). The avatar of each user (besides the avatar of the avatar that is viewing) is shown in a tray generated for each individual and can rendered as a visual representation that shows movements and gestures such as pointing with hands to other shared content in the XR environment. In such a way, the avatars are presented as dynamic assets that can be updated based on dynamic changes in the user's interactions with the user interface and user devices to make changes to the interactions of their avatars in the XR environment.

In some instances, since the presentation of a shared perspective mode can be done using different approaches, the options for the presentation can be provided as options for selection. For example, a user may select and initiate a shared mode where a group of users want to maintain a shared perspective mode while they work with a model and view the model from a table-top review mode (as shown in FIGS. 2A and 2B), and when the users want to navigate within the volume of the object, they can switch to a shared perspective mode that immerses their avatars in a mode where their viewpoint is changed and they can see the other avatars in an avatar stack. There can be other options for switching or choosing between the two options, where an option can be dynamically selected based on identifying the setup and position of users (e.g., when users are in close proximity meeting a distance criterion, the users can be immersed in the avatar stack mode). By utilizing the avatar stack mode to provide a shared perspective mode, the users can more easily adapt to different scenarios and angles for viewing XR objects, e.g., moving from a table-top review mode to an immersive 1:1 scale review mode. When a shared asset is to be viewed and worked on in a table-top review mode, the shared perspective mode where the shared asset is reoriented may be selected (as discussed in relation to FIGS. 2A, 2B, and 4A). It should be appreciated that these two options can coexist and be configured to be used based on a user selection, dynamic determination, or other predetermined or default configuration for different users and use case scenarios.

FIG. 4A shows an example of a process 400 to provide a shared perspective mode for shared viewing of an XR object in an XR environment in accordance with implementations of the present disclosure.

At 410, a first user's view is rendered to a first display device of a first user into an XR environment. For example, the first user can be provided with a table-top view of a model of an object as discussed in relation to FIG. 2A. The first user's view is generated using a first pose that is tracked for the first user. In some implementations, the first pose as tracked includes a position and orientation of the first user with respect to the XR environment.

At 420, a second avatar associated with a second user of the XR environment is identified to enter a shared perspective mode with a first avatar associated with the first user. The shared perspective can be defined for at least some content displayed in an XR environment (e.g., including a VR environment and/or an AR environment) while having individualized perspectives for at least one or more other avatars or other XR objects in the XR environment.

In some implementations, the entering of a shared perspective mode can be performed based on an active request from one or both of the first and the second users, or can be initiated by a third party (e.g., another user in the XR environment, an administrator, or an external service that configures and/or schedules collaborative sessions between users through their collaboration applications such as the collaboration application 116 of FIG. 1). The first avatar has a first frame of reference in the XR environment established when the second avatar is identified to enter the shared perspective mode with the first avatar.

At 430, a second user's view of an asset of the XR environment is generated by applying a perspective transformation to the asset of the XR environment based on a shared frame of reference for the shared perspective mode, a second frame of reference established for the second user in the XR environment, and a second pose that is tracked for the second user. In some cases, the shared frame of reference can be the first frame of reference if the first user has the view that is to be shared. In some other cases, the shared frame is different from the first frame and can be of another's user perspective that is to be shared, including the frame of the second user. In some instances, the shared frame of reference can be a frame of reference that none of the avatars in the shared perspective mode have directly. As such, when multiple avatars enter into a shared perspective mode, all of them may be provided with a rendered view of an asset of the XR environment that has not been the view of the asset of any one of the avatars prior to entering the shared perspective mode.

At 440, a second user's view is rendered to a second display device of the second user and while in the shared perspective mode into the XR environment.

Figure 4B:
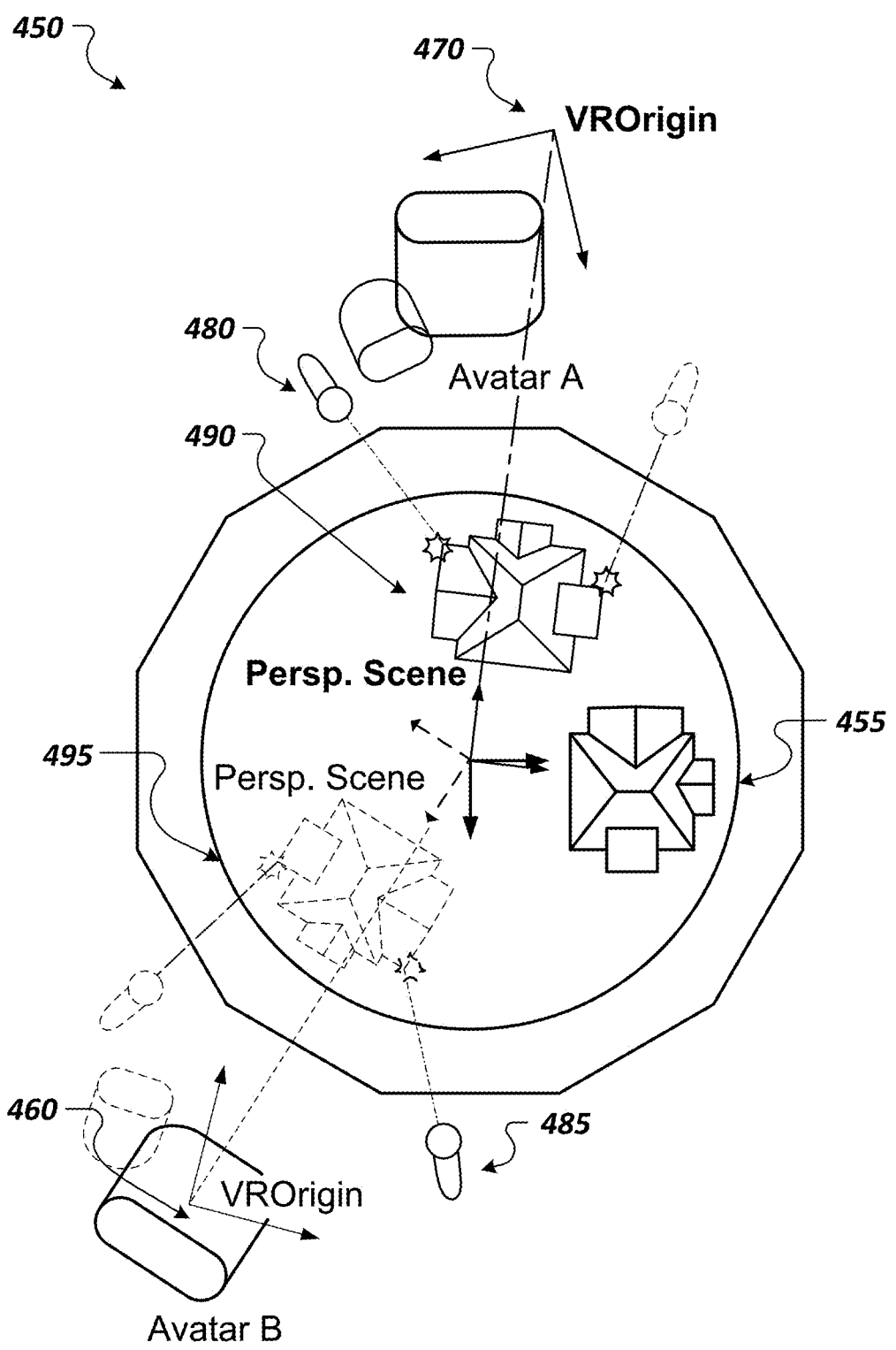
FIG. 4B shows an example scheme for performing a perspective transformation when rendering objects in a shared perspective mode in accordance with implementations of the present disclosure.

FIG. 4B shows an example scheme 450 for performing a perspective transformation when rendering objects in a shared perspective mode in accordance with implementations of the present disclosure.

In some implementations, two users can be provided with a shared perspective mode to view a model of an object from a shared perspective as described for example in relation to FIGS. 1, 2A, 2B, and 4A. The model of the object can be rendered in an XR environment in a table-top review mode where the two avatars-Avatar A and Avatar B—are located around a table as shown. The object can be rendered in the XR environment as object 455, and can be associated with a perspective view as a fixed scene that can be associated with a fixed frame of reference. For example, this perspective view that is a fixed scene can be considered as the "best" viewing perspective for the object 455.

When the avatars A and B enter the XR environment and opt for joining a shared perspective mode with regard to object 455, views for the two users of the avatars A and B can be generated in which the object 455 can be repositioned so that each one of the users sees it from the same perspective. In some implementations, views of the model of the object for the two avatars in the shared perspective mode are generated based on applying a perspective transformation to the fixed scene so that it is rotated and positioned for viewing by each of the two avatars from the same perspective that is the perspective associated with the fixed frame of reference.

In some implementations, different frames of reference are established for each of the users and are used to determine how to rotate the model of an object, provided that the center of the table is the center of reference (0,0,0) position of the 3D space. The rotation of the model of an object to be rendered in the views of the two users imposes a 2D problem since the rotation is happening for the x and the y axis (the rotation is happening on the surface of the table in a 2D coordinate system), and the upward direction z remains constant.

In some implementations, different frames of reference can be established for each of the users in the XR environment by using position information from a tracked pose of each user at that time of entry in the shared perspective mode. In some cases, a frame of reference can be referred to considered as a position and orientation with an XR environment that can be defined with respect to a coordinate system or a transformation (in 3D graphics) defined for the XR environment. As such, a frame of reference as established for a user is a local coordinate system for that user. The transformation as applied based on such coordinate system accounts for differences in location, rotation, and scale of the presentation of an object for the different users. When an asset such as an XR object is rendered in the view of a user, a perspective transform can be applied to provide as to how to change between the positions and orientations in the XR environment for different frames of reference. The transformations that can be applied for the fixed scene (as shown in FIG. 4B) can be represented mathematically and rely on rotation principles to determine a respective location, rotation, and scale for the object in a respective frame of reference for a given user (for avatar A or avatar B).

In some implementations, each user can have their own perspective transformation centered around the table (as shown with different patterns in the middle of the table of FIG. 4B) and facing the user (e.g., in the X direction). The object can then be "parented" or "attached" to that frame of reference of a respective user where when the model of an object is rendered in a view of the user, the model of an object is rendered based on adjusting its orientation to provide a same perspective viewing spot. The two users enter the shared perspective mode for the object with their own perspective frame of reference. In some implementations, in response to one of the avatars manipulating the models' position (e.g., altering the position such as rotating a house to view its north wall), the new relative coordinates of the model to that user's frame of reference can be obtained and communicated with the other user (and/or more users if these have entered the shared perspective mode). Then, when a new view is rendered for the other second user (after the modification of the object's position is made by the first user), the rendering is performed by generating a view where a transformation is applied to the object based on the relative coordinates to the frame of reference as determined for the first user and the shared frame of reference of the fixed scene 455. The transformation is applied by transferring the modifications from the frame of reference of the first user, to the shared frame of reference for the shared fixed scene, and then reapplying them to the model of an object as viewed in the second frame of reference for the second user. In such a way, the second user is provided with a view of the model of an object that is rendered from the same angle (has the same perspective) in relation to the second user as to the first user in their view.

In some implementations, views where perspective transformations are applied can be provided to the rest of the users in the shared perspective mode. The rendering can be performed based on sharing of information for modifications to the model of an object made by a respective user in their respective frame. Communicating new relative coordinates of a repositioned model of an object by a first user associated with a first frame of reference associated with the first user to other users in the shared perspective view can flexibly support the unification of the views between users. The communication of the relative coordinates can be provided to all users that are positioned around the table, where it can be appreciated that the table can take different shapes including circle, rectangle, square, other. In some implementations, the sharing of relative coordinates of a model of an object as viewed by one user to other users in a shared perspective mode can be performed while users are immersed in an XR environment and looking at a model of an object without the object being positioned on a table or desk, but rather being manipulated in their hands in the virtual reality.

In some implementations, when the two users enter the shared perspective mode, after rendering their views by applying transformations from the fixed scene 455 to their frame of reference, the two avatars A and B can be presented with a view of the model of an object
respectively 490 and 495, that has the same perspective.

In some implementations, transformations can be performed when one or more of the two users perform interactions other than modifications to the model of an object, such as pointing to portions of the model. For example, the avatar A can point with a cursor 480 to a location on the model of an object 490. Such pointing can be transferred to the view of the avatar B, where avatar B can be presented with a view of pointer 485 that matches the cursor position and orientation of the cursor 480 after applying a transformation to move from the frame of reference of the avatar A, to the frame of reference of the fixed scene 455, and then to the frame of reference of avatar B.

In some cases, continuously aligning the perspective frames of reference when rendering the views for the first and second users with the position of the user's eyes in the shared perspective view can limit the user's ability to change views and look around the model of an object to get a better understanding of its 3D structure. In some implementations, a fixed point in real space that is close to a user's is physical location can be defined and used to align and rotate the model of an object towards that point. Such determination of a point that is not exactly aligned with the eyes but still close to the position of the user can support a better user-experience while viewing the 3D model of an object in the XR environment in a shared perspective mode with the other user.

In some implementations, when the model of an object 490 is rendered for the avatar B, the rendering may need to address both the avatar's gaze and optionally where the avatar is pointing. In some cases, there can be an "ideal" or "best" position defined for a model (usually such a position is used to show a model in a workshop/presentation mode as discussed in relation to FIG. 2C.) Once such a position is determined, it can be used to be defined for the fixed scene 455 and then when rendered for different users, the model of an object can be rotated towards the other users based on their position (as determined based on user devices user for entering the XR environment).

In some implementations, for each user that enters a shared perspective mode, a VR origin is determined, which is a pose tracked for the user by the user's device such as the position of the headset when the user started the cross-reality collaboration application to enter the XR environment. As shown at FIG. 4B, the two users have VR origins 470 and 460 and those poses are used to perform a 3D transformation for the position and orientation of the respective user to determine how to represent the pointing performed by the hand of one avatar (e.g., through the pointer 480 of the hand of avatar A) to a point that lands on the model of the object for avatar B (as shown, the pointer 485 is a representation of the pointer 480 that is presented with a 3D transformation to account for the differences in the VR origins of the two avatars). In some instances, a transformation (e.g., matrix multiplication) can be applied for the pointers to get a position and orientation of the pointer of the user of avatar A and get the perspective for that pointer in the view of the user of avatar B.

In some implementations, when an asset is rendered in views of users in a shared perspective mode, those assets can be models of objects or avatars, and when they are presented from a shared perspective, a modification to the position and orientation of the asset is applied in accordance with the position and orientation of another avatar that is viewing. In some implementations, an XR object can be rotated to provide a shared perspective view, where avatars of other users using the shared perspective mode can also be rendered and those avatars can be rotated to support the understanding of the user that there are other users in the XR environment. These other users can be provided as 3D avatars with a position and orientation that is offset to align with presenting them in the view of another user. In this manner, an asset has a different position and orientation for each user in order to give the users a common perspective on the model of an object. When a view includes both a model of an object and an avatar, the model can be maintained with a shared perspective view, while the avatar can be rendered from a different perspective for each of the other users in accordance with their relative position in the real world.

FIG. 5A shows an example of a one-to-one scale collaboration review mode 500 of a user provided with an avatar stack perspective in accordance with implementations of the present disclosure. In some implementations, the one-to-one scale collaboration review mode 500 can be a review mode substantially similar to the review mode presented in FIG. 2D, where in review mode 500 the view is from the inside of the rendered XR model of an object. In the present example, the one-to-one scale collaboration review mode 500 is of the inside of a building, for example, the inside of a building such as the building presented at the table-top review mode as shown at FIG. 2A. In some implementations, a group of users may interact with an XR model of an object such as a building as shown in FIG. 2A and be provided with a shared perspective view of the building as discussed at FIGS. 2A, 2B, 3, and 4A. In some implementations, if the group of users starts interacting with the building and chooses to be provided with a one-to-one scale collaboration review model at a particular location of the building, e.g., at a given floor or room of the building, the group of users can be immersed in the one-to-one scale collaboration review mode 500 that can still maintain a shared perspective mode for all the users and also provide an avatar stack (the tray 510 and the list 550) to support the experience of a shared collaborative task with other avatars that interact with the shared content. In the case of switching from a shared perspective mode to a one-to-one scale collaboration review including an avatar, a stack can be triggered, when the users in the group are in close proximity to one another (e.g., have a physical distance between one another not more than a threshold value, or occupy an area within a predefined perimeter, among other examples).

FIG. 5A shows how a user is immersed in an XR experience from the inside of a model of an XR object (e.g., building) in a one-to-one scale review mode where the avatar stack is presented as a user interface element in form of the tray 510 and the list 550. The tray 510 is a user interface object that includes 3D avatars positioned inside the tray and the list 550 includes names of other users (inside the group and not presented with 3D avatars) that are presented with 2D avatars (in some case with name identification only (not shown)).

In some implementations, the tray 510 can be configured to present a predefined number of avatars as 3D avatars before continuing to present the avatars of the other users (e.g., user that join the shared perspective mode at a later point in time, or there may be an order of the avatars, e.g., name order) in the list 550. The views of the avatars are from within a model of an XR object in a one-to-one scale review mode, where they can interact with the model of an object and can have the same perspective view of the inside of the XR model of an object while at the same time being provided with an avatar stack 510 that includes all the users that participate in the shared view.

FIG. 5A shows how the user in the one-to-one scale collaboration review mode with the avatar stack communicates with other avatars from the group sharing the perspective of the XR model of an object (e.g., building) via a 2-way screen interaction that is supported by providing interactive 2D data 530. The interactive 2D data 530 can be rendered within the view 500 and can be rendered to each of the avatars within the view 500. It should be appreciated that the view 500 includes a view of the XR model of an object that is seen as the same by each one of the avatars, while each avatar can see the tray 510 a bit differently. An avatar in the tray 510 can be rendered with an offset as the user's view 500 allows for each user to maintain the understanding that the other users are spatially distant from them even while actually occupying the same position in the XR environment. In such a way, in the view 500, the orientation and position of the avatars of the users from the physical world can be reflected in the way that the avatars are presented in the view 500. For example, an avatar of another user in the view 500 can be presented by applying a perspective transformation (that is applied when generating the view 500) which includes moving and reorienting the avatar based on the shared frame of reference for the XR model of an object and a frame of reference established for the other user.

The shared perspective mode of an avatar stack 500 can support interaction between users, whose avatars are positioned closely to one another in the XR environment and share the same viewpoint for the content inside the model, for example, as described in relation to FIG. 2C where the view of the model was from the inside. However, it should be appreciated that the techniques used to present the same perspective view as described in relation to FIG. 2C can be applied in the context of a view of a model from the inside as shown in FIG. 5A.

When the users are immersed in an interactive experience in the avatar stack model 500, the user avatars that participate can be rendered as 3D and 2D avatars in the tray 510. For example, the avatar 520 of the user Melissa C. can be marked (e.g., with a visual indication, with a color, or with a change of pattern or of the style in which the name of the user is rendered, among other examples) to indicate this is the avatar of the user whose view is presented on FIG. 5A. Further, the tray 510 can include some avatars that are 3D avatars that are presented with a body representing the posture, gaze, and gestures of their respective users, as shown for Maddy Y, Melissa C, and Gerard S. Further, the tray 510 can include other avatars that are presented in a list 550 that include 2D avatars annotated with their respective user names. The 2D avatars can be images, logos, diagrams, or other 2D graphical representations, where the 2D avatars can be selected by each user through a user interaction with user settings or can be automatically assigned to each user upon entering the shared review mode of the avatar stack 500. In some instances, the tray 510 can be defined for a set number of avatars (e.g., in the present example there are three) that are to be presented as a 3D avatar, while the other avatars that join the view can be presented as 2D avatars in a list, as shown at list 550.

In some implementations, the tray 510 can be configured to render only one avatar as a 3D avatar that would correspond to the active speaker in the interactive sharing session. For example, the tray 510 can include only the avatar of Melissa C. 520 in the view of a user (one or more of the users in the interactive avatar stack mode 500), when Melissa C. is detected to be the active speaker. In some implementations, if another user, such as Gerard S. starts speaking, the change of the active speaker can be detected and the tray 510 can be rendered to include the avatar of Gerard S. as a single avatar presented as a 3D avatar.

In some implementations, when one or more avatars are presented as 3D avatars in the tray 510 in the user's avatar stack view 500, the 3D avatar(s) representation is rendered in the user's view 500 by applying a perspective transformation based on the single frame of reference defined for the shared perspective mode of the view 500, a frame of reference established for the avatar of the user of the view 500, and a frame of reference established for the avatar that is rendered in the tray for the avatar stack view 500.

In some implementations, if the user's view 500, the 3D avatar 520 of Melissa C. can have hands connected to the body (as shown) and a ray can shoot from a controller of the user Melissa C, where the ray can land at a point in the view, for example, at a location 560 of the 2D interactive data 530. The orientation of the 3D avatar of Melissa C. can be transformed based on the pose of the user Melissa C., the frame of reference of Melissa C. as established by her device and/or controllers, and the shared viewpoint for the avatar stack view 500. The avatar 520 of Melissa C. can be highlighted to indicate that Melissa C. is the active speaker at the time, where if another user becomes the active speaker, the highlighted avatar will be changed. In some instances, if another user associated with a 2D avatar is identified as the active speaker, then the presentation of the 3D avatars in the tray can be updated to include the avatar of that user and to render it as a 3D avatar. In some cases, other visual indications instead of highlighting can be used to indicate the avatar that corresponds to the user who is identified as an active speaker. In some implementations, to identify that a user is an active speaker, the user has to be detected to be an active speaker for a threshold period of time, e.g., 10 seconds, so that the detection of such speaker can be used as a trigger to provide an indication of an active speaker for the respective avatar or to change an existing indication for an already identified active speaker.

FIG. 5B shows an example of a process 570 for providing an avatar stack mode for shared perspective viewing of a model of an object in an XR environment where a tray of user avatars is rendered in accordance with implementations of the present disclosure.

The process 570 can be provided in the context of creating a group collaborative interaction where content in an XR environment is seen by each user from a common viewpoint. The avatars of the users part of the group can be associated with a common position in the XR environment to have shared perspective viewing.

In some implementations, the process 570 can be executed at an XR collaborative application that can support shared perspective view modes where either XR content is moved or the viewpoint of the avatars is aligned to provide the same perspective view for each user in a group. In some implementations, the process 570 can be executed in the context of a table-top review mode for XR content (e.g., as shown at FIG. 2C) or in the context of immersive one-to-one scale review mode as shown at FIG. 5A.

At 575, a first user's view is rendered to a display device of a first user. The view is into an XR environment, e.g., as described in relation to FIGS. 2C and 5A. The first user's view is generated by using a first pose that is tracked for the first user.

At 580, a first avatar of the first user is identified to have entered into a shared perspective mode with a second avatar associated with a second user of the XR environment. The shared perspective mode has a single frame of reference in the XR environment that is to be shared by the first user and the second user. In such way, the two avatars can be presented with the same view of a shared model of an object as discussed for example, in relation to FIGS. 2C and 5A, where the view is provided by changing the viewpoint of both users to have a shared perspective of the model that matches the single frame of reference as defined for the shared perspective mode. In some instances, the shared perspective can be the perspective that the first user had prior entering into the shared perspective mode, can be the perspective that the second user had prior entering into the shared perspective mode, or can be another perspective that can be dynamically determined, provided as input from a user or other application, or configured for the model that is rendered (e.g., a best perspective view for the model can be set by default).

At 585, while in the shared perspective mode, the rendering to the display device of the first user is performed by generating the first user's view to provide the first user with the same perspective to the XR environment as the one for the second user as well as to render avatars for the two users (e.g., in a tray presented in front of the first user's view as shown in FIG. 5A). The first user's view is generated by applying a perspective transformation to the second avatar of the second user based on the single frame of reference, a second frame of reference established for the second avatar, and a first frame of reference established for the first avatar when the shared perspective mode was entered. In some implementations, based on the applied perspective transformation, the second avatar is rendered within the first user's view with an orientation and a position that are offset from an orientation and a position tracked for the second user when identified as entering the shared perspective mode to adjust the position of the second avatar. Such offsetting is provided to maintain the visual experience of a spatial relationship between the two users as in the physical world. Since their viewpoint is changed but their physical position is not changed, the way that the user is oriented, where he gazes, or how he/she makes gestures, as tracked by user devices such as a headset, controllers, sensors (e.g., for movement, tracking the eyes, etc.) has to be aligned with the change of the perspective so that when the avatar is presented it has the same relative orientation and general rotation (roll, pitch, and yaw) towards the content.

Figure 6A:
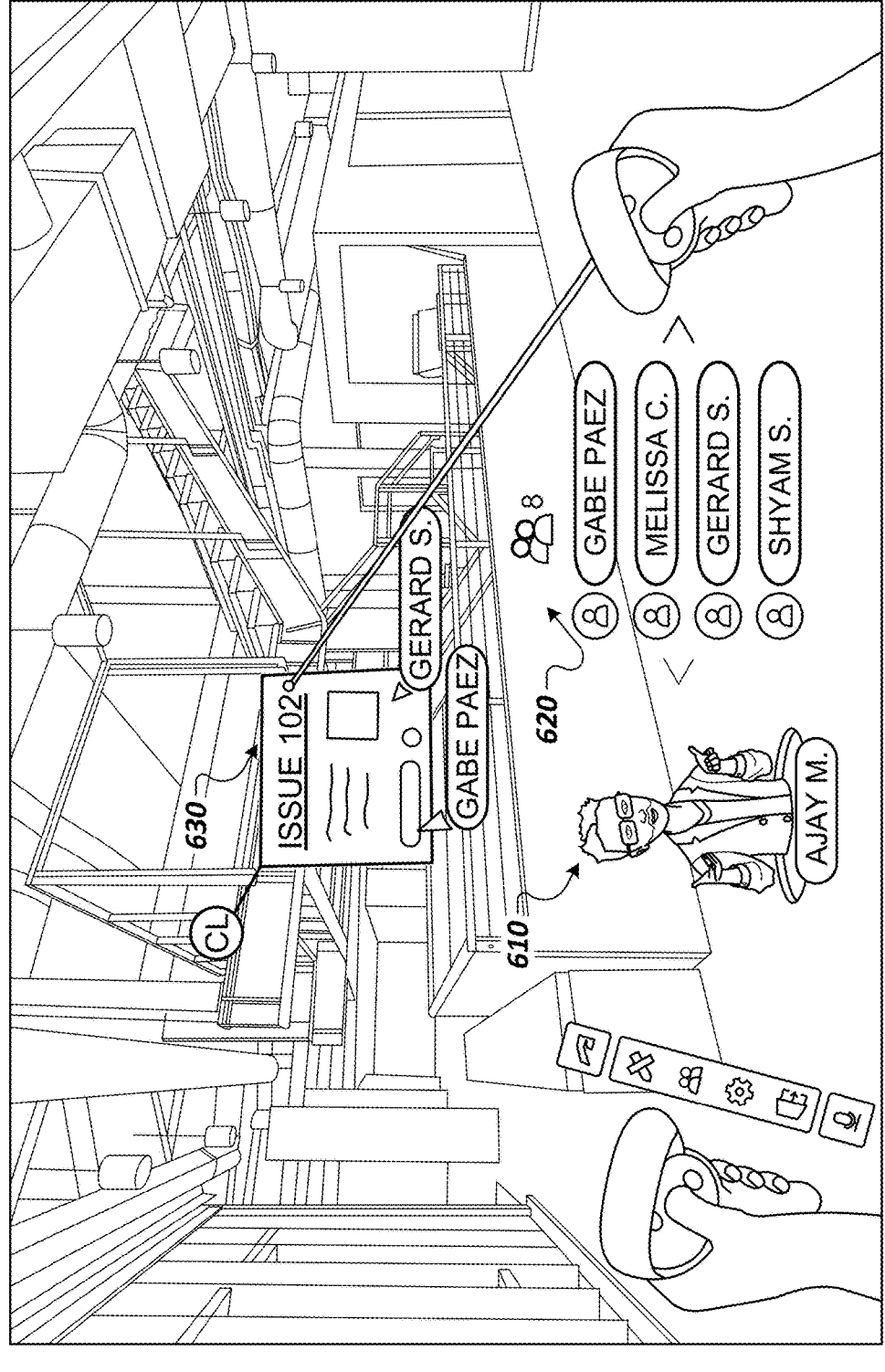
FIG. 6A shows an example user's view including an avatar stack mode with an active speaker in accordance with implementations of the present disclosure.

FIG. 6A shows an example user's view 600 including an avatar stack mode with an active speaker in accordance with implementations of the present disclosure.

In some implementations and as discussed in relation to FIGS. 2C, 5A, and 5B, users can be immersed in shared perspective mode provided with an avatar stack, where rather than manipulating the content to render the different views of the users, the viewpoint of the avatars is moved so that it is aligned with a single frame of reference.

In a first user's view 600, XR content is rendered to a first user and an avatar of the first user is presented in front of the user's view 600, i.e., the avatar Ajay M. 610. The avatar Ajay M. 610 can be presented as a 3D avatar as Ajay is the active speaker in an interactive collaborative session between multiple users (nine (9) users in total as shown by the number of avatars in the list 620 and the avatar 610). In some instances, the avatar Ajay M. 610 can be the avatar of the first user whose view 600 is presented. In some other instances, the avatar Ajay M. 610 is an avatar of a second user, who is identified as an active speaker while in a group collaboration activity in the XR environment. In some instances, tracking of the active speaker can be performed and the active speaker can be rendered with a 3D avatar in a tray, substantially similar as described in relation to FIG. 5A. The tray is also associated with other avatars that are presented in a list 620 that is substantially similar to the list 560 of FIG. 5A. The list 620 includes the avatars of all other users that are in the shared perspective mode with Ajay M 610 avatar, where the avatars in the list 620 are presented as 2D avatars.

In some implementations, by providing a tray with avatars and a list of avatars (or other combination thereof that allows users to distinguish who is the active speaker and/or provides an offset orientation of the avatar to align with the frame of reference of the first user), the first user is provided with a shared perspective view of XR content, i.e., inside XR content of an XR building object, while also including a visualization of avatars in front of the first user's view 600 to allow the understanding that other users are participating in the shared perspective viewing even if all the avatars have the same viewpoint (and can be considered to look from the same point as if they are located one on top of the other).

In some implementations, the first user's view 600 includes the avatar 610 that is identified as an active speaker, for example, the first user is the active speaker, where the 3D avatar is positioned and oriented by applying an offset to the avatar to be included in the first user's view 600 to align with the frame of reference that corresponds to the first user, with a frame of reference that is shared for the shared perspective mode (matching the shared viewpoint), and a frame of reference of the avatar of the user who is identified as an active speaker (e.g., in the case of this being the view of the first user and the first user being the active speaker, this frame is identical to the frame of reference corresponding to the first user).

In some implementations, the rendering of the shared perspective mode at another user's display device from the users part of the shared perspective mode with Ajay M. 610 can be performed by repositioning a viewpoint of the second avatar of the second user to match to the single frame of reference (defined for the shared perspective mode to look at the model from the inside) and by applying a perspective transformation to the first user's avatar Ajay M 610 based on the single frame of reference, the first frame of reference established for the avatar 610, and the second frame of reference established for the second avatar for the shared perspective mode. If it is identified that the first user is speaking while it is in the shared perspective mode with the second user, the avatar of the first user can be rendered as a 3D avatar in the views of the other avatars. In some implementations, the 3D avatar is rendered with an orientation that can be different for each user in the group, where the 3D avatar has an orientation that is offset from an orientation and a position tracked for the first user with the first pose associated with the first frame of reference established for the avatar 610, to adjust the orientation and position of the avatar 610 to align with the single frame of reference and also be rotated in view of the frame of reference relevant for the particular user into whose view the avatar is to be rendered.

Figure 6B:
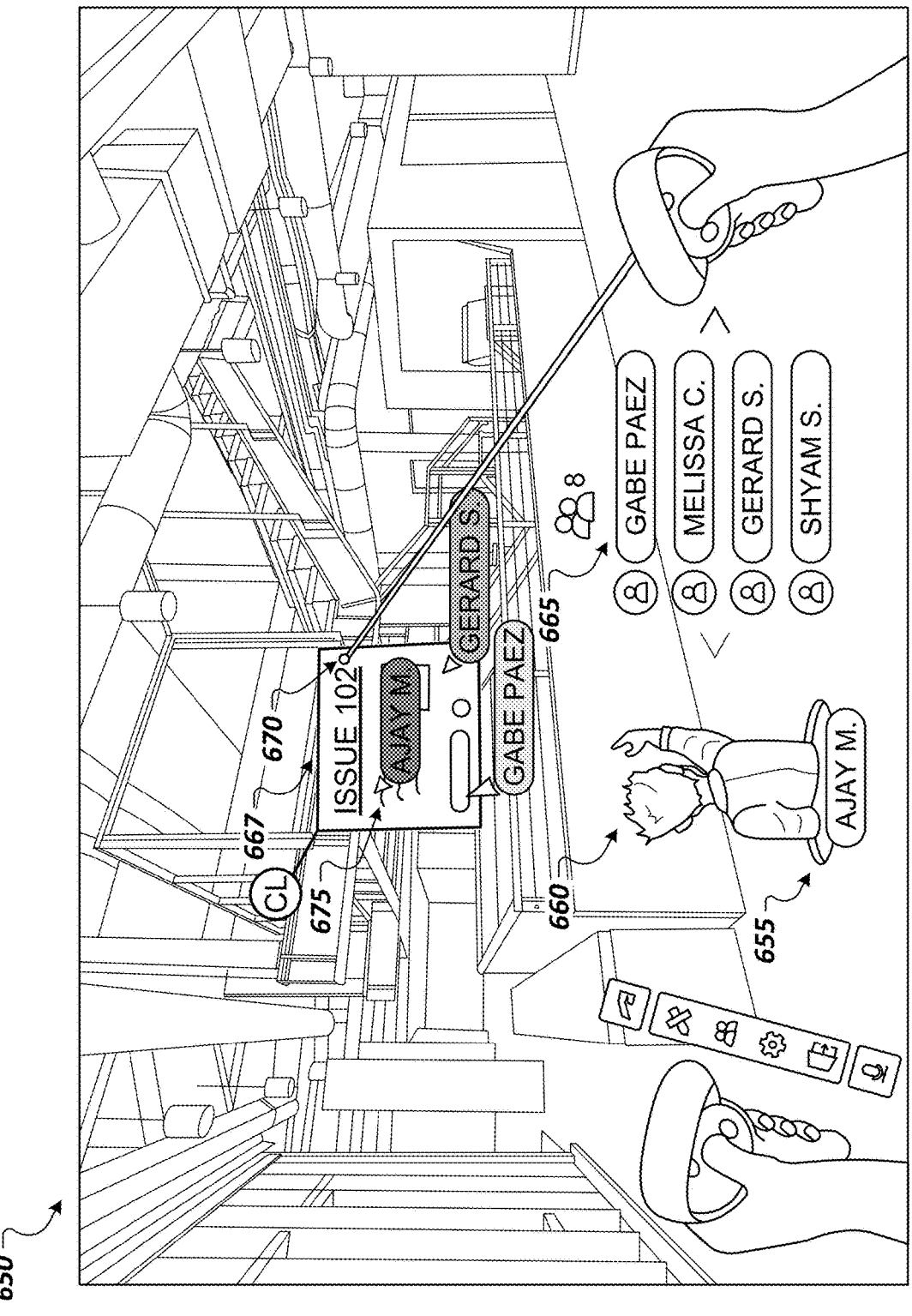
FIG. 6B shows an example of an avatar stack mode providing a representation of the gestures and gaze of an active speaking avatar in accordance with implementations of the present disclosure.

FIG. 6B shows an example of an avatar stack mode 650 providing a representation of the gestures and gaze of an active speaking avatar in accordance with implementations of the present disclosure.

As described in relation to FIG. 6A, a user can be provided with an avatar stack mode such as the avatar stack mode 600 that can correspond to the avatar stack mode 650 of FIG. 6B and a group of users are provided with a shared perspective of the inside of a 3D model of an object while at the same time presented with a tray and a list to provide a view of the avatars of the users who are participating in the shared perspective mode. As previously discussed, the avatar stack mode 650 can be rendered to a display device of a first user that includes a rendered tray 655, i.e., where an avatar 660, of Ajay M, that corresponds to the active speaker is presented. It should be appreciated that it may be possible that the mode 650 is presented for a first user who is the active speaker and corresponds to the avatar Ajay M. 660.

In some implementations, the first user who sees the avatar stack mode 650 on their display device, can also be provided with the list 665 of the other avatars in the shared perspective mode as discussed in relation to FIG. 6A. In some instances, 2D interactive data can be rendered in the shared perspective view, as discussed in relation to FIGS. 5A and 6A. The first user can use his controllers to point at 670 to the rendered 2D interactive data 667 in the shared perspective view as previously discussed. The user of the avatar Ajay M 660 interacts with the 2D interactive data 667 and can point to a location within the 2D interactive data 667. For example, each or some of the users in the avatar stack may be provided with the capability to update, modify, adjust, enhance, or delete, data from the 2D interactive data 667.

In some implementations, the user of the avatar Ajay 660 can point to a location, where the pointing can be performed by using controller devices associated with the user's device or other sensors that can track gestures of the user. The performed pointing can be associated with a particular location at the 2D interactive data as shown in the view of that user, where the location can be tracked as performed by the user of Ajay 660 and then transferred to the view of the first user including the avatar stack mode 650. The pointing as performed by Ajay 660 can be transferred to a point 675 at the 2D interactive data 667 of the first user. The point 675 can be marked with the name of the user who performed the pointing and the 3D avatar of Ajay 660 can be presented with a position and orientation which is offset in the first user's view and to point to the location 675 as shown in that view.

In some implementations, each user, such as the first user or the second user (Ajay) can have at least first and second poses that are tracked for the users. The first pose can include a first position and a first orientation of a device corresponding to the head of the user. The second pose can include a second position and a second orientation of another device or interactive tool corresponding to a pointer for the user. When the first user's view of the first user is rendered together with the pointing to content by the active speaker that is the second user (Ajay), the rendering of the pointing is performed by reorienting a graphical represen-tation of the pointer of the second user in the XR environ-ment based on a second pose for the second user, a second frame of reference established for the second avatar, and the single frame of reference relevant for the shared perspective mode (and corresponding to the shared viewpoint). In some implementations, the 3D representation of the avatar asso-ciated with the user who performed the pointing is reori-ented to include a reorientation of the presentation of the hands and the gaze of the second avatar based on an offset of the second avatar to be rendered in the tray 655 in front of the first user's view. As shown, the avatar 660 points with his hand towards the location 675, where the presented pose of the avatar 660 is an adjusted pose of the pose established for the second user according to the single frame of refer-ence that is shared in the shared perspective view and the frame of reference (or the viewpoint) corresponding to the second user.

Figure 7:
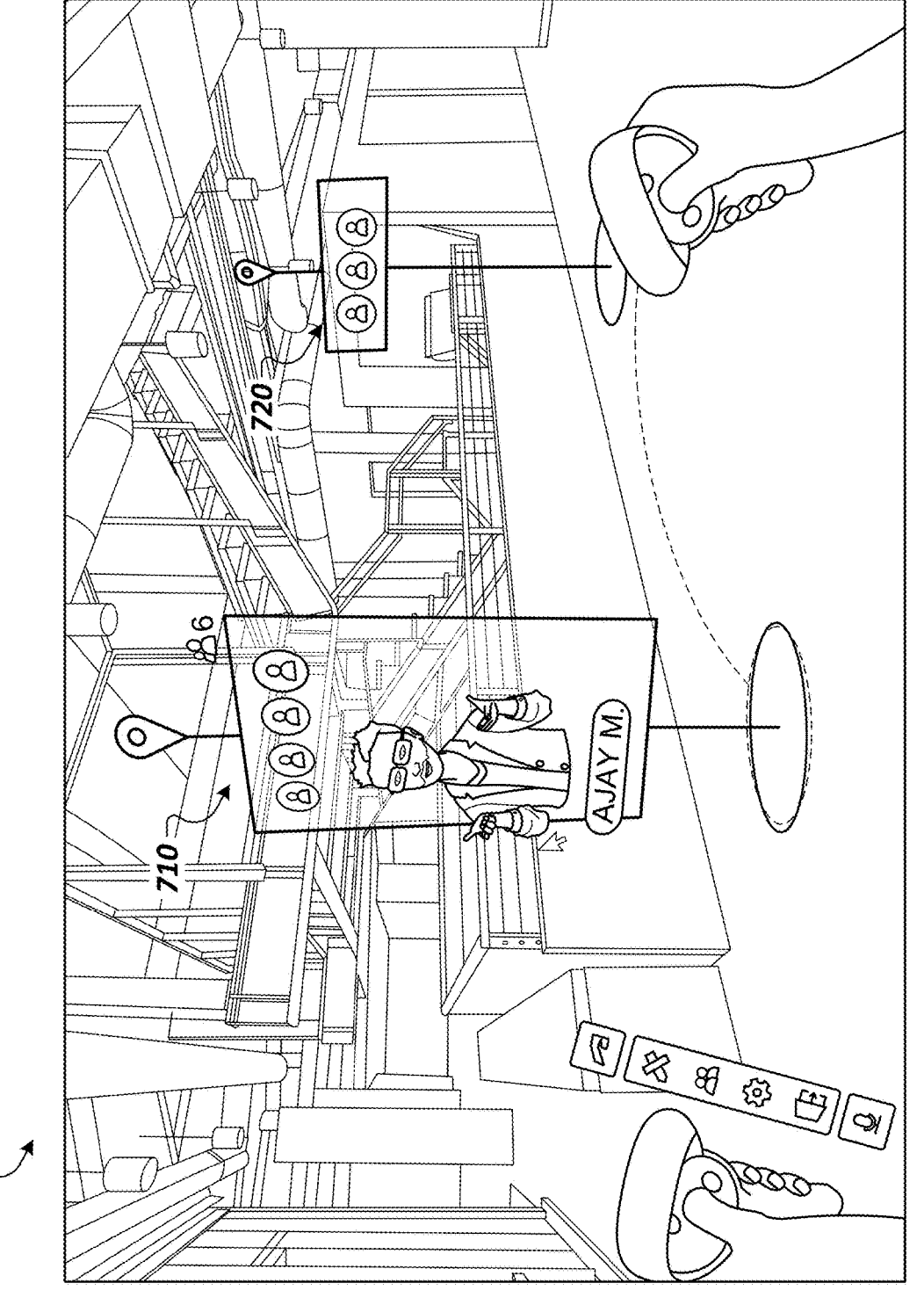
FIG. 7 shows an example avatar stack mode from a third user perspective in accordance with implementations of the present disclosure.

FIG. 7 shows an example third-person perspective 700 of an avatar stack in accordance with implementations of the present disclosure.

In some implementations, the third-person perspective 700 is a view mode provided to a third user to include an avatar stack defined in the XR environment that can be seen as a group of avatars at a location in the XR world without seeing the exact shared perspective view that is seen by each of the avatars in the stack. In some implementations, an avatar stack can be defined as described for example in relation to FIGS. 2C, 2D, 5A, 5B, 6A, and 6B.

For example, an avatar stack 710 and an avatar stack 720 can be defined in the XR environment and those can be seen in the third-person perspective 700 as groups of users when previewed in a user view of an external user. The example avatar stack mode 700 is viewed by a third-person user who is not participating in either one of the avatar stacks 710 and 720. For example, the view can be substantially similar to the view of the avatar Shyam 260 of FIG. 2D. In the example avatar stack model 700, two groups were defined to be provided with a shared perspective mode of XR content in the XR environment. The two stacks can be rendered as a bunch of avatars on top of each other (or other visual representation allowing the avatars to be shown as part of the group, e.g., as shown at FIG. 2D). However, it can be appreciated that other visualizations of the avatar stacks from a third-person perspective can be provided.

In some implementations, the third-person perspective of an avatar stack, such as of the avatar stack 710 can include a representation of the avatars as 2D avatars and/or can include a representation of one or more of the avatars as 3D avatars that can show gesturing and pointing, for example, by rendering movements of the hands of the avatars in the stack as presented to an external user. However, the user who views the third-person perspective 700 may not be provided with the same perspective view as the one shared by the users in the avatar stack 710 or the avatar stack 720. In some implementations, the avatar stack 710 includes a 3D avatar that is indicative of the active speaker in the collaborative sessions of the users associated with the avatars in the stack.

In some implementations, based on user instruction from the third-person viewing the perspective 700, the two avatar stacks can be merged into one, for example, by teleporting the avatars from the avatar stack 710 to the avatar stack 720 or the other way around. In some implementations, the user associated with the perspective 700 can configure the groups of avatars and can define the shared view that is to be associated with each avatar stack(s). In some implementa-tions, the view of a given avatar stack can be controlled by one or more of the users associated with the stack.

Figure 8:
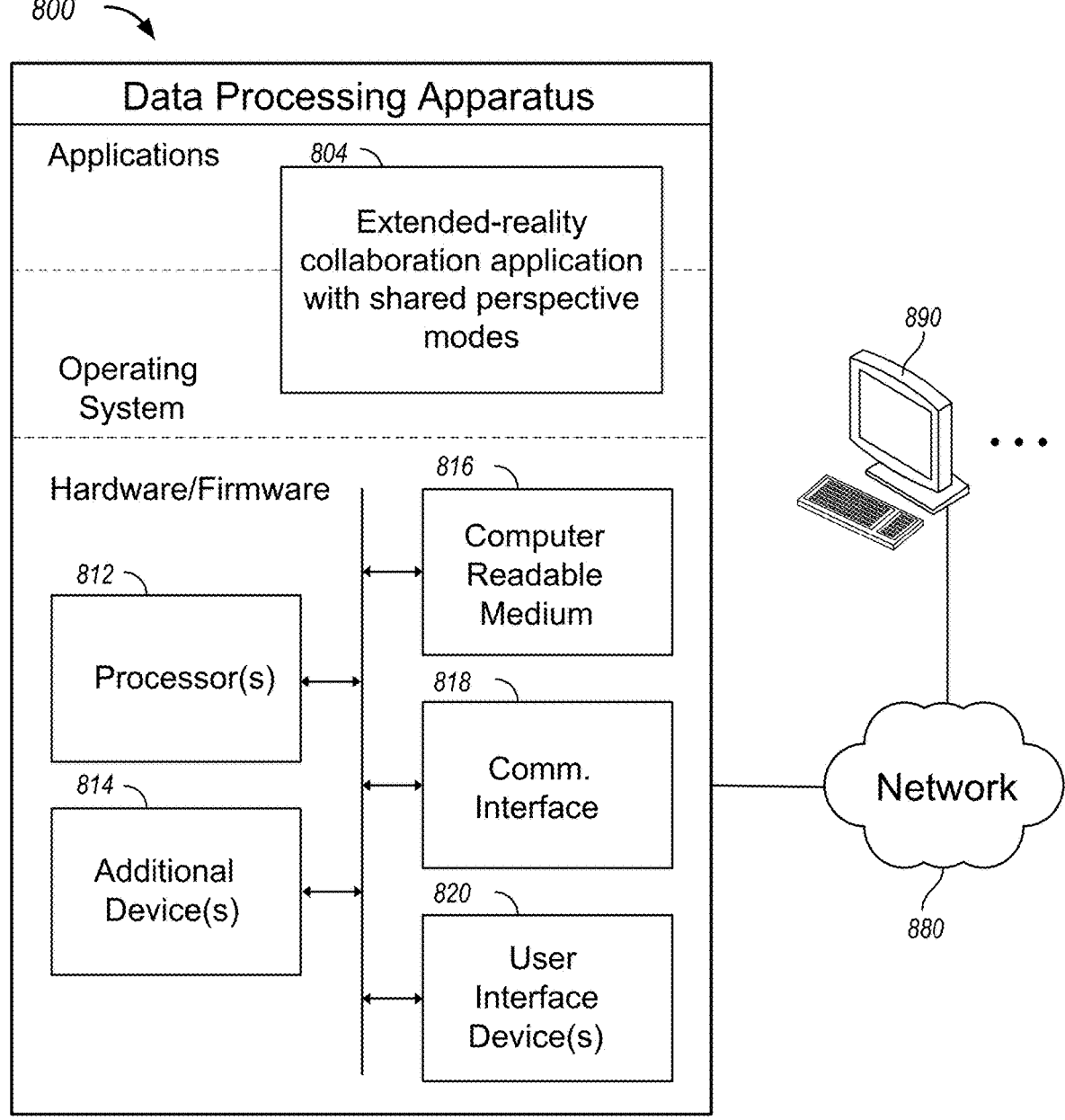
FIG. 8 is a schematic diagram of a data processing system including a data processing apparatus, which can be programmed as a client or as a server.

FIG. 8 is a schematic diagram of a data processing system including a data processing apparatus 800, which can be programmed as a client or as a server. The data processing apparatus 800 is connected with one or more computers 890 through a network 880. While only one computer is shown in FIG. 8 as the data processing apparatus 800, multiple computers can be used. The data processing apparatus 800 includes various software modules, which can be distributed between an applications layer and an operating system. These can include executable and/or interpretable software programs or libraries, including tools and services of an XR collaboration application with shared perspective modes 804 that includes a user interface that allows displaying of XR content to a user of the collaboration application 804. The view of the content can be rendered as a shared perspective view or an avatar stack that both allow for users in a shared interactive session to be presented with the same perspective representation of XR content in the XR environment. The collaboration application 804 can provide review modes such as table-top review mode or a one-to-one scale col-laboration review mode as described throughout the present disclosure. Further, the collaboration application 804 can implement conference call functionalities, content sharing and editing, determination of locations within the shared content that are pointed at by other users, and visualizing the avatars of users and identifying active speakers, among other functionalities as described throughout the present disclo-sure. The number of software modules used can vary from one implementation to another. Moreover, the software modules can be distributed on one or more data processing apparatuses connected by one or more computer networks or other suitable communication networks.

The data processing apparatus 800 also includes hardware or firmware devices including one or more processors 812, one or more additional devices 814, a computer readable medium 816, a communication interface 818, and one or more user interface devices 820. Each processor 812 is capable of processing instructions for execution within the data processing apparatus 800. In some implementations, the processor 812 is a single or multi-threaded processor. Each processor 812 is capable of processing instructions stored on the computer readable medium 816 or on a storage device such as one of the additional devices 814. The data processing apparatus 800 uses the communication interface 818 to communicate with one or more computers 890, for example, over the network 880. Examples of user interface devices 820 include a display, a camera, a speaker, a microphone, a tactile feedback device, a keyboard, a mouse, and VR and/or AR equipment. The data processing apparatus 800 can store instructions that implement operations associated with the program(s) described above, for example, on the computer readable medium 816 or one or more additional devices 814, for example, one or more of a hard disk device, an optical disk device, a tape device, and a solid-state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as a hard drive in a computer system or an optical disc sold through retail channels, or an embedded system. The computer-readable medium can be acquired separately and later encoded with the one or more modules of computer program instructions, e.g., after delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that produces an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing, and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other units suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors, executing one or more computer programs to perform functions by operating on input data and generating output. The processes and logic flows can also be performed by, and apparatus can also be implemented as, special purpose logic circuitry, e.g., a field programmable gate array (FPGA) or an application-specific integrated circuit (ASIC).

Processors suitable for the execution of a computer program include, by way of example, both general and special purpose microprocessors, and any one or more processors of any kind of digital computer. Generally, a processor will receive instructions and data from a read-only memory or a random-access memory, or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media, and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a liquid crystal display (LCD) device, an organic light emitting diode (OLED) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other, and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a browser user interface, through which a user can interact with an implementation of the subject matter described in this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, actions recited in the claims can be performed in a different order and still achieve desirable results.

EXAMPLES

Although the present application is defined in the attached claims, it should be understood that the present invention can also (additionally or alternatively) be defined in accordance with the following examples:

Shared Three-Dimensional Perspective Viewing of an Asset in an Extended Reality System Example 1. A computer-implemented method comprising:

rendering, to a display device of a first user, a first user's view into an extended reality (XR) environment, the first user's view being generated using a first pose being tracked for the first user;

identifying that a first avatar associated with the first user has entered a shared perspective mode with a second avatar associated with a second user of the XR environment, wherein the shared perspective mode has a single frame of reference in the XR environment that is shared by the first user and the second user; and performing, while in the shared perspective mode, the rendering to the display device of the first user by generating the first user's view using the first pose being tracked for the first user and a perspective transform applied to an asset based on the single frame of reference and an additional frame of reference established for the first avatar or the second avatar when the shared perspective mode was entered.

Example 2. The method of Example 1, wherein the asset is a set of content in the XR environment, the additional frame of reference is established for the first avatar based on at least a position of the first avatar indicated by the first pose when the shared perspective mode was entered, and applying the perspective transform during generation of the first user's view comprises:

rotating the set of content in the XR environment to align the single frame of reference with the additional frame of reference established for the first avatar.

Example 3. The method of Example 2, wherein each user has at least a first pose and a second pose that are tracked for the user, the first pose comprising a first position and a first orientation of a device corresponding to a head of the user, the second pose comprising a second position and a second orientation of another physical object corresponding to a pointer for the user, and the method comprises, while in the shared perspective mode:

reorienting a graphical representation of the pointer of the first user in the XR environment based on the second pose for the first user, the additional frame of reference established for the first avatar, and the single frame of reference to render the reoriented graphical representation of the pointer of the first user at a display device of the second user where a second user's view into the XR environment is provided.

Example 4. The method of any one of the preceding Examples, wherein the asset is the second avatar, the additional frame of reference is established for the second avatar based on at least a predefined offset between the first avatar and the second avatar using the shared perspective mode, and applying the perspective transform during generation of the first user's view comprises:

moving and reorienting the second avatar from the single frame of reference to the additional frame of reference.

Example 5. The method of Example 4, wherein each user has at least first and second poses being tracked for the user, the first pose comprising a first position and a first orientation of a device corresponding to a head of the user, the second pose comprising a second position and a second orientation of another device corresponding to a pointer for the user, and the method comprises, while in the shared perspective mode:

reorienting a graphical representation of a pointer of the second user in the XR environment based on the second pose for the second user, the additional frame of reference established for the second avatar, and the single frame of reference to render the reoriented graphical representation of the pointer of the second user at the display device of the first user.

Example 6. The method of Example 4, comprising:

rendering a tray of avatars, each avatar corresponding to a user of users in the shared perspective mode; and rendering the first avatar in the tray, wherein the first avatar is rendered as a 3D avatar in the XR environment based on identifying that the first user is an active speaker.

Example 7. The method of Example 4, comprising:

identifying that a third avatar of a third user is within a predefined distance threshold of the first and second avatars in the XR environment; and in response to the identification, placing the third avatar associated with the third user into the shared perspective mode with the first and second avatars.

Example 8. The method of Example 7, comprising:

identifying that a fourth avatar of a fourth user enters the XR environment; and performing rendering to a display device of the fourth user by generating a fourth user's view using a fourth pose being tracked for the fourth user and a perspective transform applied to the first avatar and the second avatar in the shared perspective mode based on the single frame of reference and a frame of reference established for the fourth avatar when the fourth avatar had entered the XR environment, wherein the fourth user's view includes a representation of the tray of avatars for the users in the shared perspective mode.

Similar operations and processes as described in Examples 1 to 8 can be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations as describes in any one of the Examples 1 to 8 can also be implemented.

Shared Perspective

Example 1. A computer-implemented method comprising:

rendering, to a first display device of a first user, a first user's view into an extended reality (XR) environment, the first user's view being generated using a first pose being tracked for the first user;

identifying that a second avatar associated with a second user of the XR environment enters a shared perspective mode with a first avatar associated with the first user;

generating a second user's view for an asset of the XR environment by applying a perspective transform to the asset of the XR environment based on a shared frame of reference for the shared perspective mode, a second frame of reference established for the second user in the XR environment, and a second pose that is tracked for the second user; and rendering, to a second display device of the second user and while in the shared perspective mode, the second user's view into the XR environment.

Example 2. The method of Example 1, wherein the asset is a three-dimensional (3D) model of an object rendered in the shared perspective mode for the first user and the second user when viewing the XR environment, wherein the first user's view and the second user's view render the asset from the same angle towards the first pose of the first user and the second pose of the second user respectively.

Example 3. The method of any one of the preceding Examples, wherein generating the second user's view comprises:

determining the shared frame of reference in the XR environment for the shared perspective mode to be shared with the first user and a third user viewing the XR environment, the shared frame of reference corresponding to the third user.

Example 4. The method of any one of the preceding Examples, wherein generating the second user's view comprises:

applying the perspective transform to the asset of the XR environment based on a first frame of reference established for the first avatar as the shared frame of reference for the shared perspective mode and a second pose that is tracked for the second user.

Example 5. The method of any one of the preceding Examples, wherein generating the second user's view for the asset of the XR environment comprises:

applying the perspective transform to rotate the asset of the XR environment based on the second frame of reference and the second pose that is tracked for the second user to align with the shared frame of reference.

Example 6. The method of Example 5, comprising:

performing, while in the shared perspective mode, the rendering to the first user by generating a new first user's view using the first pose being tracked for the first user and a perspective transform applied to the asset based on the second frame of reference and the shared frame of reference established for the first avatar of the first user when entering the shared perspective mode.

Example 7. The method of any one of the preceding Examples, wherein generating the second user's view for the asset of the XR environment comprises:

generating a view of the first avatar of the first user in the XR environment based on offsetting a 3D orientation of the first avatar based on the single frame of reference for sharing the view of the asset of the XR environment.

Example 8. The method of any one of the preceding Examples, further comprising:

receiving an instruction from the first user to change or move the asset as rendered in the first user view;

in response to receiving the instructions, rendering a second user view for the second user by applying the perspective transform to the asset as moved based on the shared frame of reference for the shared perspective mode and a second frame of reference established for the second user based on tracking the second pose for the second user when entering the shared mode.

Example 9. The method of any one of the preceding Examples, wherein each user has at least first and second poses being tracked for the user, the first pose comprising a first position and a first orientation of a device corresponding to a head of the user, the second pose comprising a second position and a second orientation of another physical object corresponding to a pointer for the user, and the method comprises, while in the shared perspective mode:

reorienting a graphical representation of the pointer of the first user in the XR environment based on the second pose for the first user, a first frame of reference established for the first avatar, and the shared frame of reference.

Similar operations and processes as described in Examples 1 to 9 can be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations as describes in any one of the Examples 1 to 9 can also be implemented.

Avatar Stack for Sharing Three-Dimensional Perspective Viewing of an Asset in an Extended Reality System Example 1. A computer-implemented method comprising:

rendering, to a display device of a first user, a first user's view into an extended reality (XR) environment, the first user's view being generated using a first pose being tracked for the first user;

identifying that a first avatar associated with the first user has entered a shared perspective mode with a second avatar associated with a second user of the XR environment, wherein the shared perspective mode has a single frame of reference in the XR environment that is to be shared by the first user and the second user and corresponds to a shared viewpoint for the first avatar and a second avatar of the second user; and performing, while in the shared perspective mode, the rendering to the display device of the first user by generating the first user's view by applying a perspective transform to the second avatar of the second user based on the single frame of reference, a second frame of reference established for the second avatar and a first frame of reference established for the first avatar for the shared perspective mode was entered.

Example 2. The method of Example 1, wherein each user has at least first and second poses being tracked for the user, the first pose comprising a first position and a first orientation of a device corresponding to a head of the user, the second pose comprising a second position and a second orientation of another device or interactive tool corresponding to a pointer for the user, and the method comprises, while in the shared perspective mode:

reorienting a graphical representation of the pointer of the second user in the XR environment based on the second pose for the second user, the second frame of reference established for the second avatar, and the single frame of reference.

Example 3. The method of Example 2, wherein the method comprises:

in response to identifying that the first user is speaking while in the shared perspective mode, performing rendering of the first avatar of the first user in the first user's view as a three-dimensional (3D) avatar with an orientation and a position that are offset based on the shared viewpoint that define a 3D position and 3D orientation in the XR environment.

Example 4. The method of any one of the preceding Examples, wherein the method comprises:

rendering, to the display device of the first user, a tray of avatars, each avatar corresponding to a user of users in the shared perspective mode; and rendering, to the display device of the first user, the second avatar in the tray that is a 3D avatar with a 3D orientation in the XR environment based on identifying that the second user is an active speaker, and wherein the 3D position of the 3D avatar is with an offset and a 3D orientation to be adjusted to the shared viewpoint.

Example 5. The method of any one of the preceding Examples, wherein the tray of avatars is rendered to include 3D and/or 2D avatars, wherein when another avatar of an other user is identified as an active speaker, the avatar of the other user can be updated to be rendered as a 2D avatar, and a 3D avatar can be rendered for the other user who is an active speaker.

Example 6. The method of any one of the preceding Examples, wherein the method comprises:

performing, while in the shared perspective mode, rendering to a display device of a second user a second user's view into the XR environment by generating the second user's view to match to the single frame of reference by applying a perspective transform to the first avatar of the first user based on the single frame of reference, and the first frame of reference established for the first avatar and the second frame of reference established for the second avatar for the shared perspective mode; and in response to identifying that the first user is speaking while in the shared perspective mode, performing rendering of the first avatar of the first user in the second user's view as a 3D avatar with orientation that is offset from an orientation and a position tracked for the first user with the first pose to adjust the orientation and position to align with the single frame of reference.

Example 7. The method of any one of the preceding Examples, wherein each user has at least first and second poses being tracked for the user, the first pose comprising a first position and a first orientation of a device corresponding to a head of the user, the second pose comprising a second position and a second orientation of another physical object corresponding to a pointer for the user, and the method comprises, while in the shared perspective mode:

reorienting a graphical representation of the pointer of the second user in the XR environment based on the second pose for the second user and a 3D representation of hands and gaze of the second avatar of the second user based on an offset for the second avatar to be rendered in a tray in front of the first user's view.

Example 8. The method of any one of the preceding Examples, wherein the method comprises:

identifying that a third avatar of a third user is within a predefined distance threshold of the first and second avatars in the XR environment; and in response to the identification, placing the third avatar associated with the third user into the shared perspective mode with the first and second avatars.

Example 9. The method of Example 8, wherein the method comprises:

identifying that a fourth avatar of a fourth user enters the XR environment; and performing rendering to a display device of the fourth user by generating a fourth user's view using a fourth pose being tracked for the fourth user and a perspective transform applied to the first avatar and the second avatar as stacked in the shared perspective mode, wherein the first avatar and the second avatar are rendered in the fourth user's view based on a frame of reference established for the fourth avatar when the fourth avatar had entered the XR environment.

Example 10. The method of Example 9, wherein the method comprises:

in response to identifying that the fourth avatar moves to a location in the XR environment that is within a threshold distance from an area in the XR environment occupied by the first and second avatar in the shared perspective mode, identifying that the fourth avatar has entered the shared perspective mode with the first and second avatars; and performing, while in the shared perspective mode, rendering to the display device of the fourth user of a new fourth user's view by generating the new fourth user's view by repositioning a viewpoint of the fourth avatar of the fourth user to match to the single frame of reference and by applying a perspective transform to avatars in the shared perspective mode based on the single frame of reference, a fourth frame of reference established for the fourth avatar and respective frames of reference established for the avatars in the shared perspective mode.

Example 11. The method of any one of the preceding Examples, wherein the method comprises:

in response to identifying that the first avatar moves to a location in the XR environment that is outside of a threshold distance from an area in the XR environment occupied by the first and second avatar when the shared perspective mode was entered, identifying that the first avatar has left the shared perspective mode with the second avatar; and performing rendering to the display device of the first user of a new first user's view by generating the new first user's view by repositioning a viewpoint of the first avatar of the first user to match to a frame of reference established for the first avatar based on a first user's device to access the XR environment.

Similar operations and processes as described in Examples 1 to 11 can be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations as describes in any one of the Examples 1 to 11 can also be implemented.

Getting in and Out of a Stack

Example 1. A system comprising:

a non-transitory storage medium having instructions of a collaboration application for an extended reality (XR) environment stored thereon; and one or more data processing apparatus configured to run the instructions of the collaboration application to cause the one or more data processing apparatus to implement a shared perspective mode in which a first avatar of a first user is placed into a stack of avatars in the shared perspective mode with a second avatar of a second user in response to the first avatar being moved to be within a distance threshold of the second avatar of the second user in the XR environment.

Example 2. The system of Example 1, wherein the instructions of the collaboration application implement the shared perspective mode by causing the one or more data processing apparatus to move a current location of the first avatar to a location of the stack of avatars at a rate that is slow enough to prevent motion sickness in the XR environment.

Example 3. The system of any one of the preceding Examples, wherein the instructions of the collaboration application implement the shared perspective mode in which each user's view generated for each user associated with an avatar of the avatars in the stack includes a graphical representation of each other avatar of the avatars in the stack at a location in each respective user's view.

Example 4. The system of Example 1, wherein the instructions of the collaboration application implement the shared perspective mode by causing the one or more data processing apparatus to teleport the first avatar from a current location of the first avatar to a location of the second avatar to join the stack, wherein the teleporting is responsive to a command received from the first user.

Example 5. The system of any one of the preceding Examples, wherein the instructions of the collaboration application implement the shared perspective mode by causing the one or more data processing apparatus to teleport an avatar to a location of the second avatar to join the stack based on a received selection of the avatar by the second user from a list of avatars rendered at a user interface component at an user's view of the second user, the set of avatars associated with the XR environment and identified by name at the user interface component.

Example 6. The system of any one of the preceding Examples, wherein the instructions of the collaboration application implement the shared perspective mode by causing the one or more data processing apparatus to gather two or more avatars into a location of the second avatar in response to user input of the second user identifying the two or more avatars to be gathered.

Example 7. The system of Example 6, wherein the user input requests an avatar to be moved to the location of the second avatar based on user's name of the avatar.

Example 8. The system of any one of the preceding Examples, wherein the instructions of the collaboration application implement the shared perspective mode by causing the one or more data processing apparatus to drag the avatars in the stack away from a current location associated with the stack of avatars to change a shared view of the avatars of the stack into the XR environment, wherein dragging the avatars based on movement of an avatar of the stack designated as a host.

Example 9. The system of any one of the preceding Examples, wherein the instructions of the collaboration application implement the shared perspective mode in which an avatar of an active speaker in the stack is rendered with a three-dimensional model representation of the avatar of the active speaker at a predefined location in each respective user's view.

Example 10. The system of any one of the preceding Examples, wherein the instructions of the collaboration application implement the shared perspective mode in which an avatar of an active speaker in the stack is rendered with a three-dimensional model of the avatar of the active speaker at a location of the stack in user views of other users associated with avatars in the XR environment, wherein the stack is within a field of view of each of the avatars of the other users.

Example 11. The system of any one of the preceding Examples, wherein the instructions of the collaboration application implement exiting of the shared perspective mode for the first avatar by causing the one or more data processing apparatus to allow the first avatar to leave the stack of avatars in response to movement of the first avatar by the first user a threshold distance away from a central location of the stack of avatars in the XR environment.

45
46

What is claimed is:

1. A computer-implemented method comprising:
rendering, to a display device of a first user, a first user's view into an extended reality (XR) environment, the first user's view being generated using a first pose being tracked for the first user;
identifying that a first avatar associated with the first user has entered a shared perspective mode with a second avatar associated with a second user of the XR environment, wherein the shared perspective mode has a single frame of reference in the XR environment that is shared by the first user and the second user; and
performing, while in the shared perspective mode, the rendering to the display device of the first user by generating the first user's view using the first pose being tracked for the first user and a perspective transform applied to an asset based on the single frame of reference and an additional frame of reference established for the first avatar or the second avatar when the shared perspective mode was entered.

2. The method of claim 1, wherein the asset is a set of content in the XR environment, the additional frame of reference is established for the first avatar based on at least a position of the first avatar indicated by the first pose when the shared perspective mode was entered, and applying the perspective transform during generation of the first user's view comprises:
rotating the set of content in the XR environment to align the single frame of reference with the additional frame of reference established for the first avatar.

3. The method of claim 2, wherein each user has at least a first pose and a second pose that are tracked for the user, the first pose comprising a first position and a first orientation of a device corresponding to a head of the user, the second pose comprising a second position and a second orientation of another physical object corresponding to a pointer for the user, and the method comprises, while in the shared perspective mode:
reorienting a graphical representation of the pointer of the first user in the XR environment based on the second pose for the first user, the additional frame of reference established for the first avatar, and the single frame of reference to render the reoriented graphical representation of the pointer of the first user at a display device of the second user where a second user's view into the XR environment is provided.

4. The method of claim 1, wherein the asset is the second avatar, the additional frame of reference is established for the second avatar based on at least a predefined offset between the first avatar and the second avatar using the shared perspective mode, and applying the perspective transform during generation of the first user's view comprises:
moving and reorienting the second avatar from the single frame of reference to the additional frame of reference.

5. The method of claim 4, wherein each user has at least first and second poses being tracked for the user, the first pose comprising a first position and a first orientation of a device corresponding to a head of the user, the second pose comprising a second position and a second orientation of another device corresponding to a pointer for the user, and the method comprises, while in the shared perspective mode:
reorienting a graphical representation of a pointer of the second user in the XR environment based on the second pose for the second user, the additional frame of reference established for the second avatar, and the single frame of reference to render the reoriented graphical representation of the pointer of the second user at the display device of the first user.

6. The method of claim 4, comprising:
rendering a tray of avatars, each avatar corresponding to a user of users in the shared perspective mode; and
rendering the first avatar in the tray, wherein the first avatar is rendered as a 3D avatar in the XR environment based on identifying that the first user is an active speaker.

7. The method of claim 4, comprising:
identifying that a third avatar of a third user is within a predefined distance threshold of the first and second avatars in the XR environment; and
in response to the identification, placing the third avatar associated with the third user into the shared perspective mode with the first and second avatars.

8. The method of claim 7, comprising:
identifying that a fourth avatar of a fourth user enters the XR environment; and
performing rendering to a display device of the fourth user by generating a fourth user's view using a fourth pose being tracked for the fourth user and a perspective transform applied to the first avatar and the second avatar in the shared perspective mode based on the single frame of reference and a frame of reference established for the fourth avatar when the fourth avatar had entered the XR environment, wherein the fourth user's view includes a representation of a tray of avatars for users in the shared perspective mode.

9. A computer-implemented method comprising:
rendering, to a first display device of a first user, a first user's view into an extended reality (XR) environment, the first user's view being generated using a first pose being tracked for the first user;
identifying that a second avatar associated with a second user of the XR environment enters a shared perspective mode with a first avatar associated with the first user;
generating a second user's view for an asset of the XR environment by applying a perspective transform to the asset of the XR environment based on a shared frame of reference for the shared perspective mode, a second frame of reference established for the second user in the XR environment, and a second pose that is tracked for the second user; and
rendering, to a second display device of the second user and while in the shared perspective mode, the second user's view into the XR environment.

10. The method of claim 9, wherein the asset is a three-dimensional (3D) model of an object rendered in the shared perspective mode for the first user and the second user when viewing the XR environment, wherein the first user's view and the second user's view render the asset from the same angle towards the first pose of the first user and the second pose of the second user respectively.

11. The method of claim 9, wherein generating the second user's view comprises:
determining the shared frame of reference in the XR environment for the shared perspective mode to be shared with the first user and a third user viewing the XR environment, the shared frame of reference corresponding to the third user.

12. The method of claim 9, wherein generating the second user's view comprises:
applying the perspective transform to the asset of the XR environment based on a first frame of reference established for the first avatar as the shared frame of reference for the shared perspective mode and a second pose that is tracked for the second user.

13. The method of claim 9, wherein generating the second user's view for the asset of the XR environment comprises:
applying the perspective transform to rotate the asset of the XR environment based on the second frame of reference and the second pose that is tracked for the second user to align with the shared frame of reference.

14. The method of claim 13, comprising:
performing, while in the shared perspective mode, the rendering to the first user by generating a new first user's view using the first pose being tracked for the first user and a perspective transform applied to the asset based on the second frame of reference and the shared frame of reference established for the first avatar of the first user when entering the shared perspective mode.

15. The method of claim 9, wherein generating the second user's view for the asset of the XR environment comprises:
generating a view of the first avatar of the first user in the XR environment based on offsetting a 3D orientation of the first avatar based on the shared frame of reference for sharing the view of the asset of the XR environment.

16. The method of claim 9, further comprising:
receiving an instruction from the first user to change or move the asset as rendered in the first user view; and
in response to receiving the instructions, rendering a second user view for the second user by applying the perspective transform to the asset as moved based on the shared frame of reference for the shared perspective mode and a second frame of reference established for the second user based on tracking the second pose for the second user when entering the shared mode.

17. The method of claim 9, wherein each user has at least first and second poses being tracked for the user, the first pose comprising a first position and a first orientation of a device corresponding to a head of the user, the second pose comprising a second position and a second orientation of another physical object corresponding to a pointer for the user, and the method comprises, while in the shared perspective mode:
reorienting a graphical representation of the pointer of the first user in the XR environment based on the second pose for the first user, a first frame of reference established for the first avatar, and the shared frame of reference.

18. A system comprising:
a non-transitory storage medium having instructions stored thereon; and
one or more data processing apparatus configured to run the instructions stored on the non-transitory storage medium, thereby causing the one or more data processing apparatus to perform operations comprising
rendering, to a display device of a first user, a first user's view into an extended reality (XR) environment, the first user's view being generated using a first pose being tracked for the first user,
identifying that a first avatar associated with the first user has entered a shared perspective mode with a second avatar associated with a second user of the XR environment, wherein the shared perspective mode has a single frame of reference in the XR environment that is shared by the first user and the second user, and
performing, while in the shared perspective mode, the rendering to the display device of the first user by generating the first user's view using the first pose being tracked for the first user and a perspective transform applied to an asset based on the single frame of reference and an additional frame of reference established for the first avatar or the second avatar when the shared perspective mode was entered.

19. The system of claim 18, wherein the asset is a set of content in the XR environment, the additional frame of reference is established for the first avatar based on at least a position of the first avatar indicated by the first pose when the shared perspective mode was entered, and applying the perspective transform during generation of the first user's view comprises rotating the set of content in the XR environment to align the single frame of reference with the additional frame of reference established for the first avatar.

20. The system of claim 19, wherein each user has at least a first pose and a second pose that are tracked for the user, the first pose comprising a first position and a first orientation of a device corresponding to a head of the user, the second pose comprising a second position and a second orientation of another physical object corresponding to a pointer for the user, and the operations comprise, while in the shared perspective mode, reorienting a graphical representation of the pointer of the first user in the XR environment based on the second pose for the first user, the additional frame of reference established for the first avatar, and the single frame of reference to render the reoriented graphical representation of the pointer of the first user at a display device of the second user where a second user's view into the XR environment is provided.

21. The system of claim 18, wherein the asset is the second avatar, the additional frame of reference is established for the second avatar based on at least a predefined offset between the first avatar and the second avatar using the shared perspective mode, and applying the perspective transform during generation of the first user's view comprises moving and reorienting the second avatar from the single frame of reference to the additional frame of reference.

22. The system of claim 21, wherein each user has at least first and second poses being tracked for the user, the first pose comprising a first position and a first orientation of a device corresponding to a head of the user, the second pose comprising a second position and a second orientation of another device corresponding to a pointer for the user, and the operations comprise, while in the shared perspective mode, reorienting a graphical representation of a pointer of the second user in the XR environment based on the second pose for the second user, the additional frame of reference established for the second avatar, and the single frame of reference to render the reoriented graphical representation of the pointer of the second user at the display device of the first user.

23. The system of claim 21, wherein the operations comprise
rendering a tray of avatars, each avatar corresponding to a user of users in the shared perspective mode, and
rendering the first avatar in the tray, wherein the first avatar is rendered as a 3D avatar in the XR environment based on identifying that the first user is an active speaker.

24. The system of claim 21, wherein the operations comprise
identifying that a third avatar of a third user is within a predefined distance threshold of the first and second avatars in the XR environment, and in response to the identification, placing the third avatar associated with the third user into the shared perspective mode with the first and second avatars.

25. The system of claim 24, wherein the operations comprise identifying that a fourth avatar of a fourth user enters the XR environment, and performing rendering to a display device of the fourth user by generating a fourth user's view using a fourth pose being tracked for the fourth user and a perspective transform applied to the first avatar and the second avatar in the shared perspective mode based on the single frame of reference and a frame of reference established for the fourth avatar when the fourth avatar had entered the XR environment, wherein the fourth user's view includes a representation of a tray of avatars for users in the shared perspective mode.

26. A system comprising:

a non-transitory storage medium having instructions stored thereon; and one or more data processing apparatus configured to run the instructions stored on the non-transitory storage medium, thereby causing the one or more data processing apparatus to perform operations comprising rendering, to a first display device of a first user, a first user's view into an extended reality (XR) environment, the first user's view being generated using a first pose being tracked for the first user;

identifying that a second avatar associated with a second user of the XR environment enters a shared perspective mode with a first avatar associated with the first user;

generating a second user's view for an asset of the XR environment by applying a perspective transform to the asset of the XR environment based on a shared frame of reference for the shared perspective mode, a second frame of reference established for the second user in the XR environment, and a second pose that is tracked for the second user; and rendering, to a second display device of the second user and while in the shared perspective mode, the second user's view into the XR environment.

27. The system of claim 26, wherein the asset is a three-dimensional (3D) model of an object rendered in the shared perspective mode for the first user and the second user when viewing the XR environment, wherein the first user's view and the second user's view render the asset from the same angle towards the first pose of the first user and the second pose of the second user respectively.

28. The system of claim 26, wherein generating the second user's view comprises determining the shared frame of reference in the XR environment for the shared perspective mode to be shared with the first user and a third user viewing the XR environment, the shared frame of reference corresponding to the third user.

29. The system of claim 26, wherein generating the second user's view comprises applying the perspective transform to the asset of the XR environment based on a first frame of reference established for the first avatar as the shared frame of reference for the shared perspective mode and a second pose that is tracked for the second user.

30. The system of claim 26, wherein generating the second user's view for the asset of the XR environment comprises applying the perspective transform to rotate the asset of the XR environment based on the second frame of reference and the second pose that is tracked for the second user to align with the shared frame of reference.

31. The system of claim 30, wherein the operations comprise performing, while in the shared perspective mode, the rendering to the first user by generating a new first user's view using the first pose being tracked for the first user and a perspective transform applied to the asset based on the second frame of reference and the shared frame of reference established for the first avatar of the first user when entering the shared perspective mode.

32. The system of claim 26, wherein generating the second user's view for the asset of the XR environment comprises generating a view of the first avatar of the first user in the XR environment based on offsetting a 3D orientation of the first avatar based on the shared frame of reference for sharing the view of the asset of the XR environment.

33. The system of claim 26, wherein the operations comprise receiving an instruction from the first user to change or move the asset as rendered in the first user view, and in response to receiving the instructions, rendering a second user view for the second user by applying the perspective transform to the asset as moved based on the shared frame of reference for the shared perspective mode and a second frame of reference established for the second user based on tracking the second pose for the second user when entering the shared mode.

34. The system of claim 26, wherein each user has at least first and second poses being tracked for the user, the first pose comprising a first position and a first orientation of a device corresponding to a head of the user, the second pose comprising a second position and a second orientation of another physical object corresponding to a pointer for the user, and the operations comprise, while in the shared perspective mode, reorienting a graphical representation of the pointer of the first user in the XR environment based on the second pose for the first user, a first frame of reference established for the first avatar, and the shared frame of reference.

* * * * *